United States Patent [19]
Katori

[11] Patent Number: 5,745,779
[45] Date of Patent: Apr. 28, 1998

[54] NETWORK SUBSYSTEM FOR PARALLEL PROCESSOR SYSTEM AND NETWORK SYSTEM FOR PARALLEL PROCESSOR SYSTEM

[75] Inventor: Masayuki Katori, Kawasaki, Japan

[73] Assignee: Fujitsu Limited, Kawasaki, Japan

[21] Appl. No.: 313,903

[22] Filed: Sep. 28, 1994

[30] Foreign Application Priority Data

Dec. 28, 1993 [JP] Japan ............................ 5-338574

[51] Int. Cl.⁶ .................................................. G06F 15/16
[52] U.S. Cl. ........................... 395/800.01; 395/200.3; 395/200.75; 395/728
[58] Field of Search .................... 395/200.01, 800, 395/200.16, 728

[56] References Cited

U.S. PATENT DOCUMENTS

| | | |
|---|---|---|
| 4,365,292 | 12/1982 | Barnes et al. . |
| 4,498,133 | 2/1985 | Bolton et al. . |
| 4,752,777 | 6/1988 | Franaszek et al. . |
| 4,814,762 | 3/1989 | Franaszek et al. . |
| 5,170,484 | 12/1992 | Grondalski et al. . |
| 5,212,773 | 5/1993 | Hillis .................... 395/200.16 |
| 5,333,268 | 7/1994 | Douglas et al. ........... 395/200 |
| 5,377,262 | 12/1994 | Bales et al. ............. 379/220 |
| 5,388,213 | 2/1995 | Oppenheimer et al. ...... 395/200 |
| 5,392,405 | 2/1995 | Komatsu et al. .......... 395/728 |

FOREIGN PATENT DOCUMENTS 53-502071  12/1983  Japan .
5-307533   11/1993  Japan .

*Primary Examiner*—Alyssa H. Bowler
*Assistant Examiner*—Walter D. Davis
*Attorney, Agent, or Firm*—Armstrong, Westerman, Hattori, McLeland & Naughton

[57] ABSTRACT

A network system for a parallel processor system includes network subsystems connecting processor units to each other, where contention generated in communication between the processor units is restrained so as to increase the throughput of the system, improve the extensibility of the system, and enable the system to be formed by an amount of materials depending on a scale of the system. Each of the network subsystem comprising an input port, a group address judging unit making a judgement as to whether a destination undecided data supplied through the input port is addressed to its own subgroup or not, a network switch unit conducting a switching when the destination undecided data is judged to be addressed to its own subgroup to output it as a destination decided data, a destination decided data contention unit applied two destination decided data fed from the network switching unit and the input port to solve contention between the two destination decided data, an output port outputting the destination decided data, and another output port outputting the destination undecided data when said destination undecided data is judged to be addressed another subgroup by the group address judging unit.

48 Claims, 11 Drawing Sheets

F I G. 4
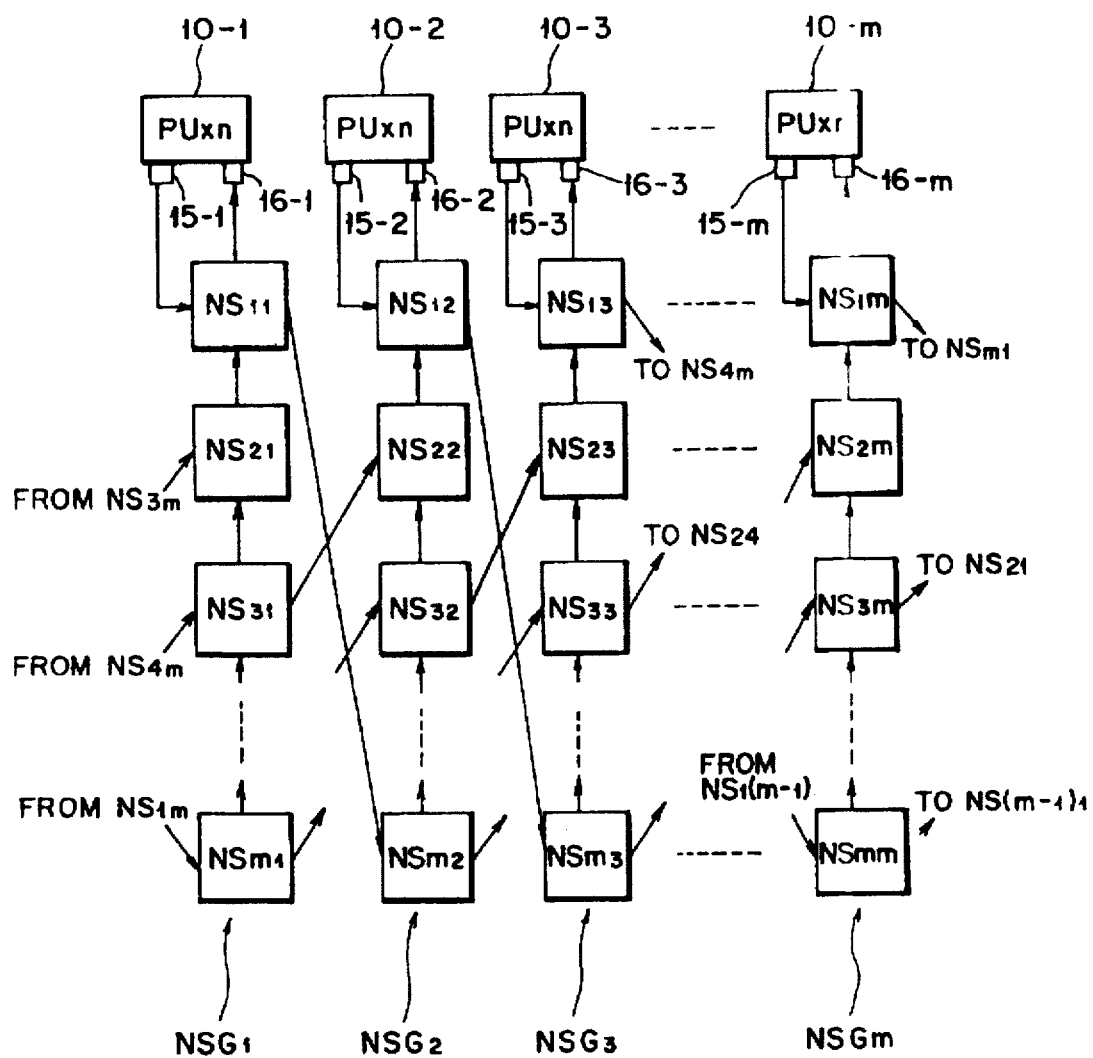

NETWORK SUBSYSTEM FOR PARALLEL PROCESSOR SYSTEM AND NETWORK SYSTEM FOR PARALLEL PROCESSOR SYSTEM

BACKGROUND OF THE INVENTION

The present invention relates, in general, to a parallel processor system which executes information processing at a high rate by operating a number of processor units in parallel, more specifically, to a network subsystem and a network system used to interconnect the processor units in such parallel processor system.

In recent years, a lot of studies and developments have been made on a parallel processor system which can process information at a high rate by operating in parallel a number of processor units, accompanied by a marked trend in society to give much more weight to utilization of information.

In a parallel processor system, communication between or among processor units is essential since a number of processor units are operated in parallel. For this reason, it is necessary to provide a network to the parallel processor system to house the processor units therein.

As network system used to accommodate the processor units therein, there are a crossbar network, a hypercube network, an omega network, a tree network, an array network, etc. FIGS. 9 through 13 illustrate concepts of these networks.

For instance, a crossbar network shown in FIG. 9 includes processor units PU1–PU4. Each of switches 100-1 to 100-4 provided in the network allows a communication between a certain processor unit and a predetermined destination, for example, between the processor unit PU1 and the processor unit PU3. In the crossbar network, it is possible to communicate between the processor units so long as the objective processor unit is not busy. There occurs, therefore, a less contention in communication between the processor units, but it is difficult to connect a plurality of processor units since a quantity of the hardware is proportional to the square of the number of the processor units.

A hypercube network shown in FIG. 10 is configured as a cube, which includes processor units PU1–PU8 at each vertex of the cube. In the omega network shown in FIG. 11, each of processor units PU1–PU8 generates an address to establish a communication with an objective processor unit via appropriate modules among 101a–101d, 102a–102d and 103a–103d. In the tree network shown in FIG. 12, each of processor units PU1–PU8 generates an address to communicate with an objective processor unit via appropriate modules among 104a–104g connected to each other in a tree-like configuration.

A quantity of the hardware of the hypercube network, the omega network or the tree network is relatively small because of it being proportional to a logarithmic value of the number of the processor units. However, if a plural sets of the processor units communicate simultaneously, the processor units PU1–PU8, modules 101a–101d, 102a–102d, 103a–103d and 104a–104g sometimes yield contention on a transit path. It is therefore said that the hypercube network, the omega network and the tree network are prone to yield contention to a considerable degree.

The array network shown in FIG. 13 is configured by connecting processor units PU1-1 to PU1-16 to each other on a plane. A quantity of the hardware of the array network is the smallest among the above networks because it is proportional to the number of processor units. Such array network has, however, a disadvantage that there occurs a lot of contention.

Meanwhile, a quantity of data transfer in a network relates to a width of the bus and a data transfer rate. If a width of the data bus is increased, the data transfer rate becomes greater. But, the increased width of the data bus imposes a difficulty when a plurality of processing units are connected to a network. Alternatively, if the data transfer rate is increased, a quantity of the data transfer becomes greater. This, however, causes a limitation in physical distance between the network and the processor units. As a result, it becomes difficult to place a plurality of processor units around the network system.

In this regard, the omega network, the tree network and the array network have extensibility since their network can be configured within the physical range above mentioned. The hypercube network has a shortage in physical structure of the processor units that the limited number of the processor units are connectable. The crossbar network has heretofore an extremely low extensibility since it is formed with only one system.

As stated above, the hypercube network, the omega network, the tree network and the array network have an advantage to have extensibility since they can be configured with a small amount of the materials. On the other side, they have a disadvantage that it is impossible to improve throughput of the system since there occurs a lot of contention in communication between the processor units.

A problem of the above networks rests on that it is difficult to form a large-scaled system, in which a plurality of processor units are connectable, with an increased throughput in communication between the processor units.

SUMMARY OF THE INVENTION

To overcome the above problems, the present invention provides a network subsystem for a parallel processor system and a network system for a parallel processor system, where contention between processor units is restrained to the minimum to improve throughput of the system, in addition, extensibility of the system is improved to enable the system to be formed with an amount of the materials depending on a scale of the system, from a small-scaled system to a large-scaled system.

The network subsystem for a parallel processor system according to this invention comprises a first input port receiving a destination undecided data to be transmitted from one of a plurality of processor units included in a processor unit set belonging to its own group or another network subsystem for the parallel processor system to another processor unit belonging to its own group or a processor unit belonging to another group, a second input port receiving a destination decided data from another network subsystem for the parallel processor system, a group address judging unit making a judgement on said destination undecided data inputted through the first input port as to whether said destination undecided data is addressed to a processor unit belonging to its own group or not, a network switch unit conducting a switching to the processor unit to which said destination undecided data is addressed when the group address judging unit judges that said destination undecided data is addressed to said processor unit belonging to its own group to output said destination undecided data as a destination decided data, a destination decided data contention unit applied said another destination decided data from the network switch unit and said destination decided data from the second input port to solve contention when said two destination decided data have the same destination so that the contention generates between said two destination decided data, and outputting said two destination decided data, a first output port outputting said destination decided data applied from the destination decided data contention unit to said addressed processor unit or another network subsystem for the parallel processor system, and a second output port outputting said destination undecided data as it is to another network subsystem for the parallel processor system when said destination undecided data is judged by the group address judging unit to be addressed to a processor unit belonging to its own group. It is possible in the network subsystem to employ a crossbar switch to the network switch unit.

A network system for a parallel processor system according to this invention comprises m×m network subsystems $NS_{ij}$ for the parallel processor system, where i and j are natural numbers from 1 to m being configured into a matrix, each of said network subsystems having the same structure as the above network subsystem. In the network system for the parallel processor system, the m network subsystems $NS_{1j}, NS_{2j}, \ldots, NS_{mj}$ form a network subgroup $NS_j$, and m sets of the network subgroups $NSG_j$ are formed in said network system. In the network system for the parallel processor system, the first input ports of the network subsystems $NS_{11}, NS_{12}, \ldots, NS_{1m}$ belonging to the respective m network subgroups $NSG_1-NSG_m$ each is connected to data output ports of n processor units. The first output ports of the network subsystems $NS_{11}, NS_{12}, \ldots, NS_{1m}$ each is connected to data input ports of the n processor units. The first output ports of network subsystems $NS_{ij}$ except the network subsystems $NS_{11}, NS_{12}, \ldots, NS_{1m}$ are connected to the second input ports of the network subsystems $NS_{(i-1)j}$ except the network subsystems $NS_{m1}, NS_{m2}, \ldots, NS_{mm}$, respectively. The second output ports of the network subsystems $NS_{ij}$ except the network subsystems $NS_{m1}, NS_{m2}, \ldots, NS_{mm}$ and the network subsystems $NS_{1m}, NS_{2m}, \ldots, NS_{(m-1)m}$ are connected to the first input ports of the network subsystems $NS_{(i+1)(j+1)}$ except the network subsystems $NS_{11}, NS_{12}, \ldots, NS_{1m}$, respectively. The second output ports of the network subsystems $NS_{1m}, NS_{2m}, \ldots, NS_{(m-1)m}$ are connected to the first input ports of the network subsystems $NS_{21}, NS_{31}, \ldots, NS_{m1}$, respectively. It is possible to omit the second input ports, the second output ports and the destination contention units in the network subsystems $NS_{m1}, NS_{m2}, \ldots, NS_{mm}$.

As another aspect, this invention also provides a network system for a parallel processor system comprising m×m network subsystems $NS_{ij}$ for the parallel processor system, where i and j are natural numbers from 1 to m, being configured into a matrix, each of which network subsystems has the same structure as the above network subsystem. In the network system for the parallel processor system, the m network subsystems $NS_{1j}, NS_{2j}, \ldots, NS_{mj}$ form a network subgroups $NSG_j$, and m sets of the network subgroups $NSG_j$ are formed in said network system. In the network systems for the parallel processor system, the first input ports of the network subsystems $NS_{11}, NS_{12}, \ldots, NS_{1m}$ belonging to the respective m sets of network subgroups $NSG_1-NSG_m$ each is connected to data output ports of n processor units. The first output ports of the network subsystems $NS_{11}, NS_{12}, \ldots, NS_{1m}$ each is connected to data input ports of the n processor units. The first output ports of the network subsystems $NS_{ij}$ except the network subsystems $NS_{11}, NS_{12}, \ldots, NS_{1m}$ are connected to the second input ports of the network subsystems $NS_{(i-1)j}$ except the network subsystems $NS_{m1}, NS_{m2}, \ldots, NS_{mm}$, respectively. The second output ports of the network subsystems $NS_{1m}, NS_{3m}, \ldots, NS_{mm}$ being connected to the first input ports of the network subsystems $NS_{m1}, NS_{21}, NS_{31}, \ldots, NS_{(m-1)1}$ respectively.

As still another aspect, this invention also provides a network system for a parallel processor system comprising m×m network subsystems $NS_{ij}$ for the parallel processor system, where i and j are natural numbers from 1 to m, being configured into a matrix, each of which network subsystems has the same structure as the above network subsystem. In the network system for the parallel processor system, the m network subsystems $NS_{1j}, NS_{2j}, \ldots, NS_{mj}$ form a network subgroups $NSG_j$, and m sets of the network subgroups $NSG_j$ are formed in said network system. In the network system for the parallel processor system, the first input ports of the network subsystems $NS_{11}, NS_{12}, \ldots, NS_{1m}$ belonging to the respective m sets of network subgroups $NSG_1-NSG_m$ each is connected to data output ports of n processor units. The first output ports of the network subsystems $NS_{11}, NS_{12}, \ldots, NS_{1m}$ each is connected to data input ports of the n processor units. The first output ports of the network subsystems $NS_{ij}$ except the network subsystems $NS_{11}, NS_{12}, \ldots, NS_{1m}$ are connected to the second input ports of the network subsystems $NS_{(i-1)j}$ except the network subsystems $NS_{m1}, NS_{m2}, \ldots, NS_{mm}$, respectively. The second output ports of the network subsystems $NS_{ij}$ belonging to the respective network subgroups $NSG_1, NSG_2, \ldots, NSG_{m-1}$ and the second output ports of arbitrary m−2 network subsystems among the network subsystems $NS_{2j}, NS_{3j}, \ldots, NS_{mj}$ belonging to the respective network subgroups $NSG_1, NSG_2, \ldots, NSG_{m-1}$ are connected to the first input ports of arbitrary network subsystems $NS_{2j}, NS_{3j}, \ldots, NS_{mj}$ belonging to the respective neighbouring network subgroups $NSG_2, NSG_3, \ldots, NSG_m$, respectively. The second output ports of the network subsystem $NS_{1m}$ belonging to the network subgroup $NSG_m$ and the second output ports of arbitrary m−2 network subsystems among the network subsystems $NS_{2m}, NS_{3m}, \ldots, NS_{mm}$ belonging to the network subgroup $NSG_m$ are arbitrarily connected to the first input ports of the network subsystems $NS_{21}, NS_{31}, \ldots, NS_{m1}$ belonging to the network subgroup $NSG_1$, respectively.

In the network subsystems $NS_{1j}, NS_{2j}, \ldots, NS_{mj}$ belonging to the same network subgroup $NSG_j$, it is possible to arbitrarily combine the two network subsystem with each other. In each of the combined network subsystems, it is possible to combine the group address judging units and the network switch unit, respectively, while commonly using the only one destination decided data contention unit. In the network subsystems $NS_{1j}, NS_{2j}, \ldots, NS_{mj}$ belonging to the same network subgroup $NSG_j$, it is also possible to combine the network subsystem $NS_{1j}$ with $NS_{2j}$, the network subsystem $NS_{3j}$ with $NS_{4j}, \ldots,$ the network subsystem $NS_{(m-1)j}$ with $NS_{mj}$, respectively.

A plurality of the network groups each made up of the m network subgroups $NSG_1-NSG_m$ may be connected in parallel to the processor unit sets each including the n processor units. Furthermore, the network switch unit may be formed as a crossbar switch.

In the above network subsystem for parallel processor system according to this invention, the first input ports receives a destination undecided data to be transmitted from one of a plurality of processor units belonging to its own group or another network subsystem for a parallel processor system to a processor unit belonging to its own group or a processor unit belonging to another group, the group address judging unit makes a judgement on said destination undecided data as to whether said destination undecided data is addressed to a processor unit belonging to its own group or not, and the network switching unit conducts a switching to the processor unit to which said destination undecided data is addressed to output said destination undecided data as a destination decided data when said destination undecided data is judged to be addressed to a processor unit belonging to its own group.

On the other hand, the second input ports receives another destination decided data from another network subsystem for a parallel processor system, then outputs said destination decided data to the destination decided data contention unit. The destination decided data contention unit receives the destination decided data from the network switching unit and the another destination decided data through the second input port to solve contention when the contention generated between said two destination decided data.

The first output ports outputs the destination decided data supplied from the destination decided data contention unit to said plural processor units or another network subsystem for a parallel processor system.

If the group address judging unit makes a judgement on said destination undecided data that said destination undecided data is not addressed to any processor unit belonging to its own group, the second output port outputs said destination undecided data as it is to another network subsystem for a parallel processor system.

In the network system for a parallel processor system according to this invention, the network subsystems may be configured into a matrix of m×m, the neighbouring two network subgroups among the m sets of the network subgroups $NSG_1$–$NSG_m$ may be suitably connected to each other, and m sets of the n processor units may be connected in parallel, whereby a communication between the processor units may be established under a condition of minimum contention and improved throughput of the network.

As stated above, the network subsystems for a parallel processor system and the network system for a parallel processor system according to this invention has the following advantages:

(1) It is possible to restrict development of contention in communication between the processor units to improve the throughput of the network.

(2) It is possible to form a large-scaled network system without decreasing the processing rate in the entire system.

(3) It is possible to make up the network system with an amount of materials depending on a scale of the system, from a small-scaled system to a large-scaled system.

(4) It is possible to reduce an amount of the hardware since the network subsystems can be combined, thereby contributing a reduction in size of the system.

(5) It is possible to transfer much more data simultaneously by connecting plural sets of the network groups in parallel to increase the processing rate.

BRIEF DESCRIPTION OF THE DRAWINGS

FIG. 4 is a block diagram of a network system for a parallel processor system according to a second embodiment of this invention;

Figure 1:
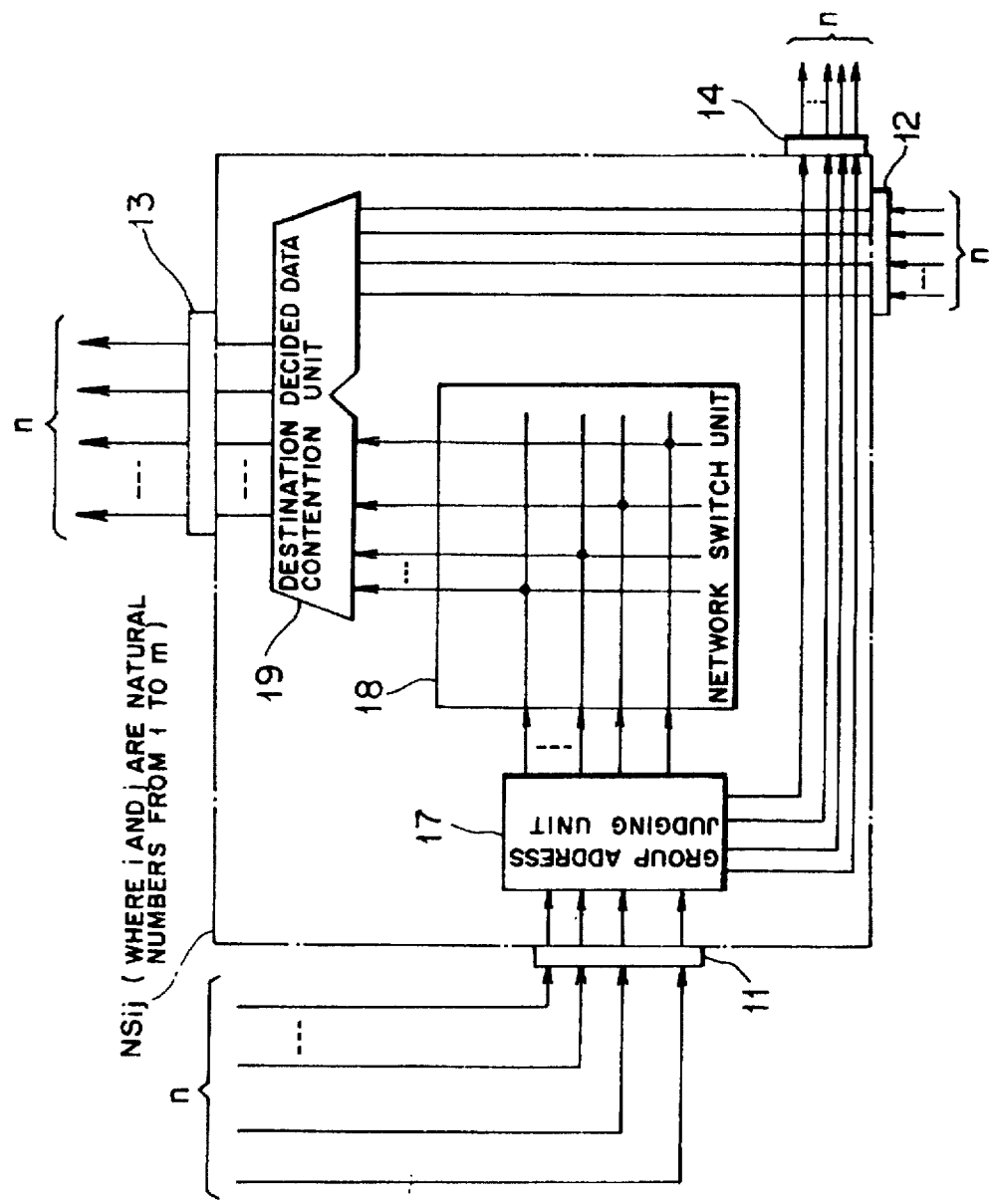
FIG. 1 is a block diagram of a network subsystem for a parallel processor system according to a first embodiment of this invention.

DESCRIPTION OF THE PREFERRED EMBODIMENTS (a) Description of the first embodiment Hereinafter, description will be made of embodiments of this invention referring to the drawings.

Figure 2:
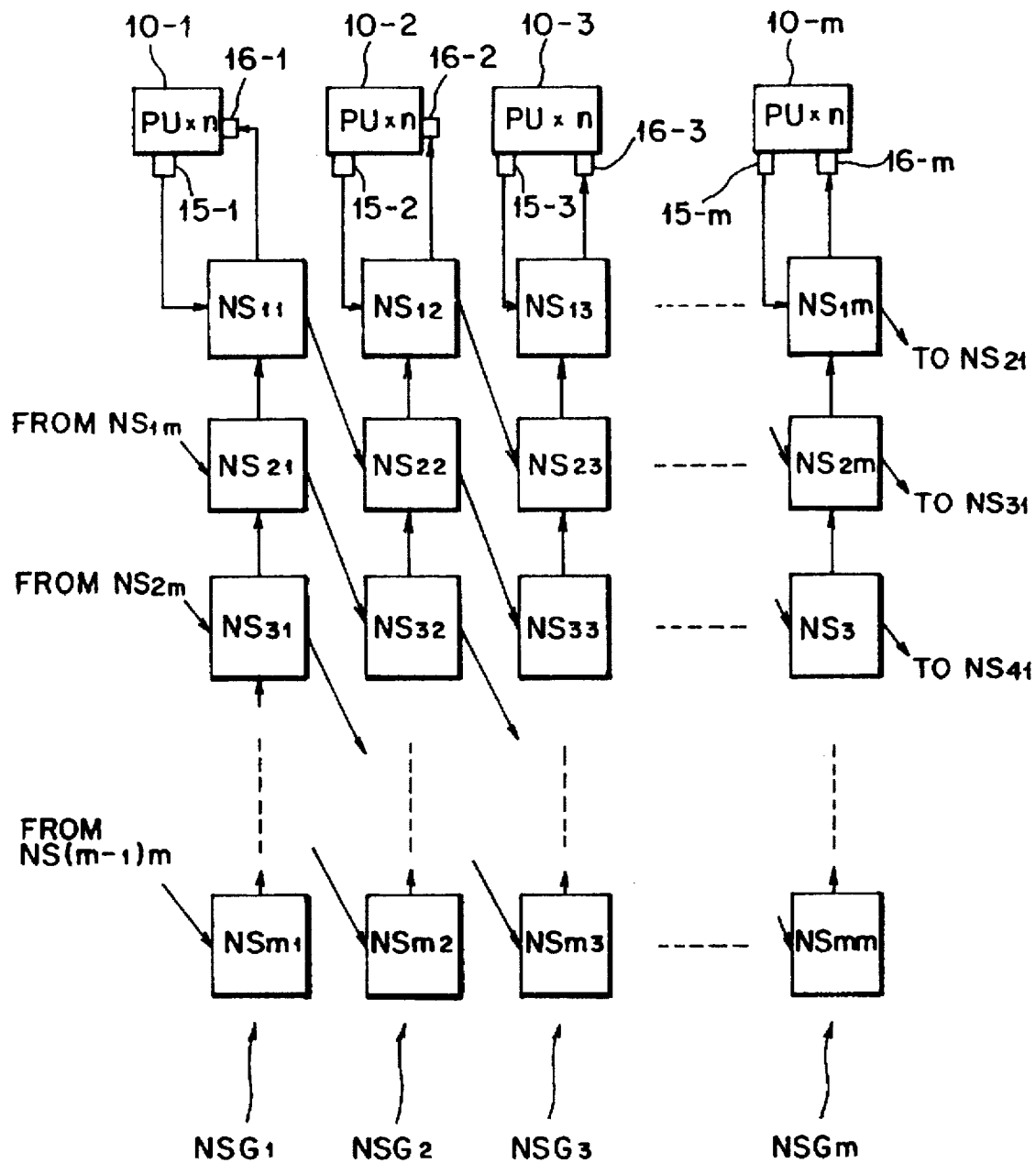
FIG. 2 is a block diagram of a network system for a parallel processor system according to the first embodiment of this invention.

FIG. 2 is a block diagram of a network system used for a parallel processor system as a first embodiment of this invention. The network system shown in FIG. 2 includes a plurality of processor unit sets 10-1–10-m, each of which includes n processor units. These processor unit sets operate in parallel to process information at a high rate.

The network system also includes m×m network subsystems $NS_{11}$–$NS_{mm}$ used for the parallel processor system (hereinafter referred simply as a network subsystem). These network subsystems $NS_{ij}$ (where i and j are natural numbers from 1 to m) are configured in a matrix of m×m, connected with each other by data cables. The m network subsystems $NS_{ij}$, $NS_{2j}$, ..., $NS_{mj}$ make up a network subgroup $NSG_j$. The m network subgroups make up a network group. Each network subsystem $NS_{ij}$ has a structure whose detail is shown in FIG. 1.

Referring to FIG. 1, reference numeral 11 denotes a first input port. The first input port 11 is served to receive a destination undecided data to be transmitted from its own processor unit set (i.e., n processor units belonging to its own group) 10-j in the processor unit sets 10-1–10-m or a network subsystem belonging to another network subgroup to a processor unit belonging to its own network group or another group.

A second input port designated by reference numeral 12 is served to receive a destination decided data from a network subsystem positioning farther from the processor unit set within its own network subgroup.

A group address judging unit 17 makes a judgement on the destination undecided data supplied through the first input port 11 as to whether it is addressed to a processor unit belonging to its own group or not.

A network switch unit 18 executes a switching to a processor unit that is a destination of the destination undecided data when said destination undecided data is judged to be addressed to a processor unit belonging to its own group by the group address judging unit 17, and outputs it as a destination decided data. This network switch unit 18 is configured as, for example, an n×n crossbar network.

A destination decided data contention unit 19 is supplied the destination decided data from the network switch unit 18 and another destination decided data through the second input port 12 to solve contention if there occurs the contention due to presence of different two address decided data addressed to the same destination, and outputs them in order.

A first output port 13 outputs the destination decided data fed from the destination decided data contention unit 19 to a processor unit belonging to its own group or a network subsystem positioning closer to the processor unit in its own network subgroup.

A second output port 14 outputs the address undecided data to a network subsystem in another network subgroup, if said destination undecided data is judged by the group address judging unit 17 not to be addressed to a processor unit belonging to its own group.

According to this embodiment, the network subsystems $NS_{ij}$ are connected to each other as shown in FIG. 2 to form the network system for a parallel processor system.

More specifically, data output ports 15-1–15-m of the respective processor unit sets 10-1–10-m are,respectively, connected the first input ports 11 of the respective network subsystems $NS_{11}$–$NS_{1m}$. And, data input ports 16-1–16-m of the processor unit sets 10-1–10-m are connected to the first output ports 13 of the network subsystems $NS_{11}$, $NS_{12}$, . . . , $NS_{1m}$, respectively.

The first output ports 13 of the network subsystems $NS_{ij}$ except the network subsystems $NS_{11}$, $NS_{12}$, . . . , $NS_{1m}$ are connected to the second input ports 12 of the network subsystems $NS_{(i-1)j}$ except the network subsystems $NS_{m1}$, $NS_{m2}$, . . . , $NS_{mm}$, respectively.

The second output ports 14 of the network subsystems $NS_{ij}$ except the network subsystems $NS_{m1}$, $NS_{m2}$, . . . , $NS_{mm}$ and the network subsystems $NS_{1m}$, $NS_{2m}$, . . . , $NS_{(m-1)m}$ are connected to the first input ports 11 of the network subsystems $NS_{(i+1)(j+1)}$ except the network subsystems $NS_{11}$, $NS_{12}$, . . . , $NS_{1m}$, respectively.

The second output ports 14 of the network subsystems $NS_{1m}$, $NS_{2m}$, . . . , $NS_{(m-1)m}$ are connected to the first input ports 11 of the network subsystems $NS_{21}$, $NS_{31}$, . . . , $NS_{m1}$, respectively.

The network system according to the first embodiment with the above structure operates as follows.

When one of the n processor units in the processor unit sets 10-1 gets into communication with a processor unit in the processor unit set 10-1 or in another processor unit set, a data including predetermined address information is transmitted as a destination undecided data to the network subsystem $NS_{11}$ through the data input port 15-1.

The address information included in the data fed from the processor unit set 10-1 is applied to the group address judging unit 17 through the first input port 11 shown in FIG. 1. The group address judging unit 17 makes a judgement as to whether the address information included in the inputted data is addressed to a processor unit belonging to its own group, that is, a processor unit included in the processor unit 10-1, or not.

When the group address judging unit 17 judges the inputted address information to be addressed to one of the processor units included in the processor unit set 10-1, the network switch unit 18 conducts a switching to the processor unit that is the destination of said address information, then outputs said destination undecided data as a destination decided data to the destination decided data contention unit 19.

The destination decided data contention unit 19 is applied the destination decided data from the network switching unit 18 and the other destination decided data supplied through the second input port 12 from the network subsystem $NS_{21}$. If the applied two destination decided data have the same destination, the destination decided data contention unit 19 outputs them in order of priority to the processor unit set 10-1 through the first output port 13.

If the supplied address information is not addressed to any one of the processor units included in the processor unit set 10-1, the destination undecided data is outputted as it is to the network subsystem $NS_{22}$ from the second output port 14, and an address judgement is made on said destination undecided data in the same manner as in the network subsystem $NS_{11}$.

If the address information of the data inputted to the network subsystem $NS_{22}$ is addressed to one of the processor units included in the processor unit set 10-2 of its own group, the destination undecided data is outputted as a destination decided data to the destination decided data contention unit 19 in the network subsystem NS12 positioning closer to the processor unit than the network subsystem $NS_{22}$ through the second input port 12.

In the same manner, an address judgement is made in the network subsystems $NS_{33}$, . . . , $NS_{mm}$ until the destination undecided data having predetermined address information becomes a destination decided data. After all, the destination decided data is outputted to a processor unit that is the destination in the communication designated by the predetermined address information.

In the case of transmission from a processor unit included in the processor unit set other than the processor unit included in the processor unit set 10-1, the destination decided data is outputted to an addressed processor unit in the same manner.

If the address information of the data inputted to one of the network subsystems $NS_{1m}$, $NS_{2m}$, . . . , $NS_{(m-1)m}$ is not addressed to a processor unit included in the processor unit set 10-m, this address information as destination undecided data is outputted to the corresponding network subsystem $NS_{21}$, $NS_{31}$, . . . , or $NS_{m1}$ through the second output port 14.

If the destination of the destination undecided data is not decided in the group address judging unit 17 in any network subsystems $NS_{m1}$, $NS_{m2}$, . . . , $NS_{mm}$, the processor unit which has initially transmitted the data is informed of a transmission error so that said destination undecided data is disposed.

As above, the first embodiment has advantages that occurrence of contention in communication between the processor units is suppressed to a minimum so as to improve throughput of the network. In addition, it is possible to form, without difficulty, the network system with elements of the number depending on a scale of the system, from a small-scaled system to a large-scaled system.

The network subsystems are mutually connected by data cables so that a large-scaled network system becomes feasible without decreasing a processing rate in the entire system.

In the first embodiment described above, all the m×m network subsystems have the same structure shown in FIG.

Figure 3:
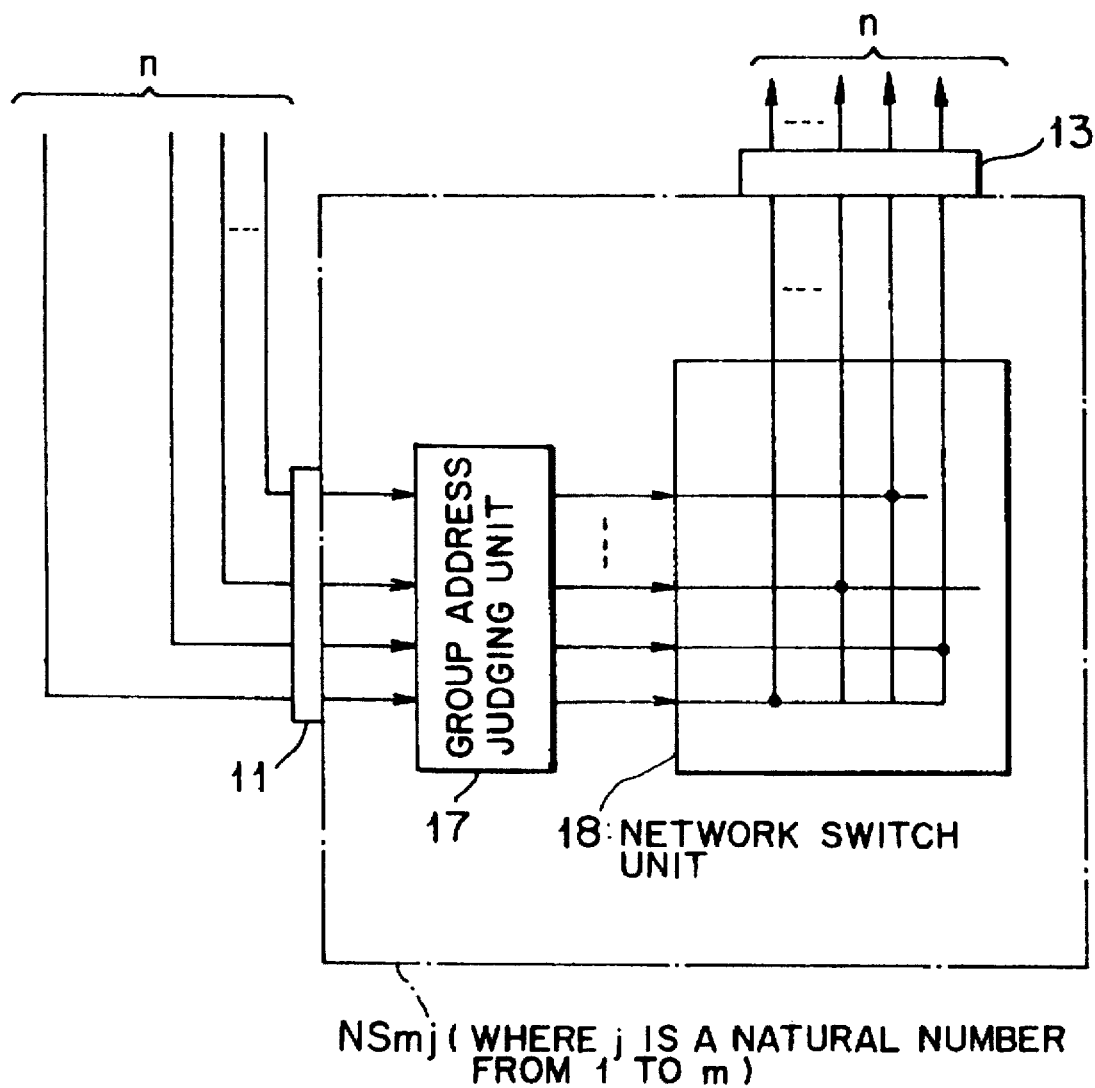
FIG. 3 is a block diagram of a modification of the network subsystem according to the first embodiment of this invention.

1. The present invention is, however, not limited to the above example. It is, for example, possible to omit the second input port 12, the second output port 14 and the destination decided data contention unit 19 in the network subsystems $NS_{m1}$, $NS_{m2}$, ..., $NS_{mm}$, as shown in FIG. 3. With this structure, it becomes possible to reduce the number of the elements used to form the ports 12,14 and the destination decided data contention unit 19.

(b) Description of Second Embodiment

FIG. 4 is a block diagram of a network system for a parallel processor system according to a second embodiment of this invention. As same as the network system according to the first embodiment shown in FIG. 1, the network system for a parallel processor system according to this second embodiment shown in FIG. 4 includes network subsystems $NS_{ij}$ (where i and j are natural numbers of 1 to m) which are configured in a matrix of m×m, and the network subsystems $NS_{ij}$, $NS_{2j}$, ..., $NS_{mj}$ make up m sets of network subgroups $NSG_j$. Only a difference between these network systems is a mode of connecting the network subsystems $NS_{ij}$.

More specifically, data output ports 15-1–15-m of processor unit sets 10-1–10-m each including n processor units are connected to first input ports of the network subsystems $NS_{11}$, $NS_{12}$, ..., $NS_{1m}$ belonging to respective m network subgroups $NSG_1$–$NSG_m$, respectively, as same as in the network system according to the first embodiment.

Data input ports 16-1–16-m of the m processor unit sets are connected to first output ports 13 of the network subsystems $NS_{11}$, $NS_{12}$, ..., $NS_{1m}$, respectively.

The first output ports 13 of the network subsystems $NS_{ij}$ except the network subsystems $NS_{11}$, $NS_{12}$, ..., $NS_{1m}$ are connected to second input ports 12 of the network subsystems $NS_{(i-1)j}$ except the network subsystems $NS_{m1}$, $NS_{m2}$, ..., $NS_{mm}$.

In other words, the first output ports 13 of the network subsystems $NS_{ij}$ except the network subsystems $NS_{11}$, $NS_{12}$, ..., $NS_{1m}$ are respectively connected to the second input ports 12 of the network subsystems $NS_{(i-1)j}$ positioned just above the respective network subsystems $NS_{ij}$.

Second output ports 14 of the network subsystems $NS_{11}$, $NS_{12}$, ..., $NS_{1m}$ are connected to the first input ports 11 of the network subsystems $NS_{m2}$, $NS_{m3}$, ..., $NS_{mm}$, $NS_{m1}$, respectively.

The second output ports 14 of the network subsystems $NS_{ij}$ except the network subsystems $NS_{11}$, $NS_{12}$, ..., $NS_{1m}$ and the network subsystems $NS_{2m}$, $NS_{3m}$, ..., $NS_{mm}$ are connected to the first input ports 11 of the network subsystems $NS_{(i-1)(j+1)}$ except the network subsystems $NS_{11}$, $NS_{12}$, ..., $NS_{1m}$, respectively. In addition, the second output ports 14 of the network subsystems $NS_{1m}$, $NS_{2m}$, $NS_{3m}$, ..., $NS_{mm}$ are connected to the first input ports 11 of the network subsystems $NS_{m1}$, $NS_{21}$, $NS_{31}$, ..., $NS_{(m-1)1}$, respectively.

With the above structure, the network system for a parallel processor system of the second embodiment operates as follows.

For instance, when a communication is carried out between one of the n processor units included in the processor unit set 10-1 as a sender and another processor unit except the sender included in the processor unit sets 10-1–10-m shown in FIG. 4, data having predetermined address information is outputted as a destination undecided data to the network subsystem $NS_{11}$ through the data input port 15-1.

The address information included in the data outputted from the processor unit set 10-1 is inputted to a group address judging unit 17 via the first input port 11 as shown in FIG. 1. The group address judging unit 17 judges on the basis of the address information of the inputted data as to whether said data is addressed to a processor unit belonging to its own group, that is, a processor unit included in the processor unit set 10-1, or not.

If the group address judging unit 17 judges that the inputted address information is addressed to a processor unit included in the processor unit set 10-1, a network switch unit 18 executes a switching to the processor unit that is a destination of the address information, outputs then said destination undecided data as a destination decided data to a destination decided data contention unit 19.

The destination decided data contention unit 19 is fed the destination decided data from the network switch unit 18 and another destination decided data from the network subsystem $NS_{21}$ through the second input port 12 thereof. If the two destination decided data have the same destination, the destination decided data contention unit 19 outputs them in order of priority to the processor unit 10-1 through the first output port 13.

If the inputted address information is not addressed to any one of the processor units included in the processor unit set 10-1, the group address judging unit 17 outputs said destination undecided data as it is to the network subsystem $NS_{m2}$ from the second output port 14. In the network subsystem $NS_{m2}$, the address judgement is made as same as in the network subsystem $NS_{11}$.

Incidentally, if the address information of the data inputted to the network subsystem $NS_{m2}$ is addressed to one of the processor units included in the processor unit set 10-2 as its own group, the network subsystem $NS_{m2}$ outputs said destination undecided data as a destination decided data to the destination decided data contention unit 19 of the network subsystem $NS_{(m-1)2}$ positioning closer to the processor unit 10-2 than the network subsystem $NS_{m2}$ through the second input port 12.

The destination decided data inputted to the network subsystem $NS_{(m-1)2}$ is outputted to the network subsystem $NS_{(m-2)2}$ via the input port 12, the destination decided data contention unit 19 and the output port 13, then to the processor unit set 10-2 through the network subsystems $NS_{(m-3)2}$, ..., $NS_{12}$ in order.

If the address information of the data inputted to the network subsystem $NS_{m2}$ is not addressed to any one of the processor units included in the processor unit set 10-2 as its own group, the destination undecided data is outputted to the network subsystem $NS_{(m-1)3}$ via the first input port 11 thereof. The group address judging unit 17 of the network subsystem $NS_{(m-1)3}$ makes a judgement on the destination undecided data.

In the same manner, the address judgement is successively made in the network subsystems $NS_{(m-4)4}$, ..., $NS_{1m}$ until the destination undecided data including the predetermined address information becomes a destination decided data. Finally, the destination decided data is outputted to a processor unit that corresponds to a destination of the predetermined address information.

In the case of a transmission from a processor unit included in a processor unit set other than the processor unit included in the processor unit set 10-1, a destination decided data is finally outputted to an addressed processor unit as same as above.

If the address information of the data inputted to one of the network subsystems $NS_{1m}$, $NS_{3m}$, $NS_{4m}$, ..., $NS_{2m}$ is not addressed to a processor unit included in the processor unit sets 10-m, the address information of the destination undecided data is outputted from the second output port 14 to the corresponding network subsystem $NS_{m1}$, $NS_{21}$, $NS_{31}$, ..., or $NS_{(m-1)1}$.

If a destination of the destination undecided data is not decided in the group address judging unit 17 in any network subsystems $NS_{21}$, $NS_{22}$, ..., $NS_{2m}$, the sender processor unit is informed of a transmission error and said destination undecided data is disposed.

As above, the second embodiment has, as same as the first embodiment, advantages that occurrence of contention in communication between the processor units is suppressed to a minimum so as to improve throughput of the network. In addition, it is possible to form, without difficulty, the network system with elements of the number depending on a scale of the system, from a small-scaled system to a large-scaled system.

The network subsystems are mutually connected by data cables so that a large-scaled network system become feasible without decreasing a processing rate in the entire system.

(c) Description of Third Embodiment

Figure 5:
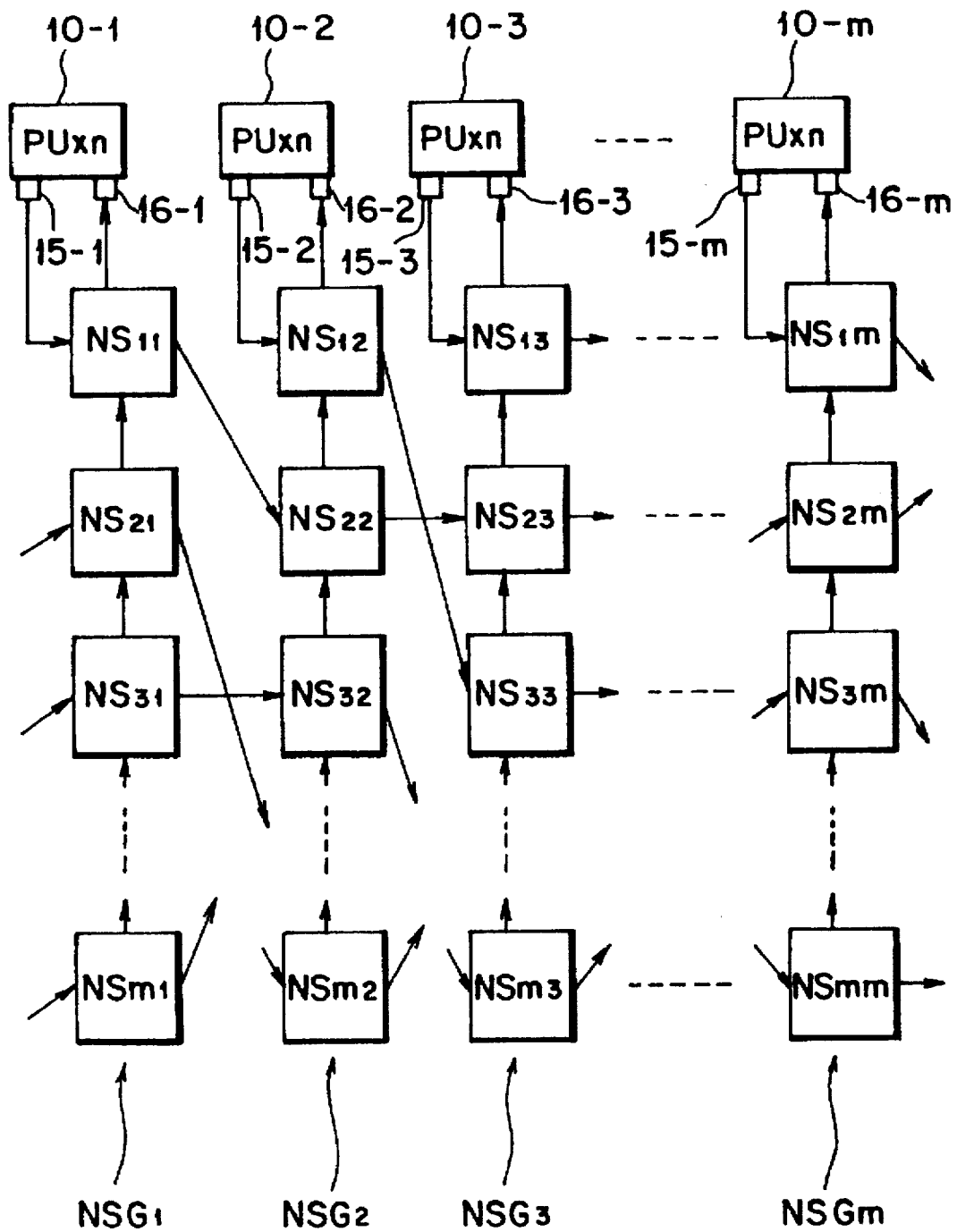
FIG. 5 is a block diagram of a network system for a parallel processor system according to a third embodiment of this invention.

FIG. 5 is a block diagram of a network system for a parallel processor system according to a third embodiment of this invention. As same as the network systems according to the first and second embodiments shown in FIGS. 1 and 4, the network system for a parallel processor system according to this third embodiment shown in FIG. 5 includes network subsystems $NS_{ij}$ (where i and j are natural numbers of 1 to m) which are configured in a matrix of m×m, and the network subsystems $NS_{ij}$, $NS_{2j}$, ..., $NS_{mj}$ make up m sets of network subgroups $NSG_j$. Only a difference between these network systems is a mode of connecting the network subsystems $NS_{ij}$.

More specifically, first input ports 11 of the network subsystems $NS_{11}$, $NS_{12}$, ..., $NS_{1m}$ included in the respective m sets of the network subgroups $NSG_1$–$NSG_m$ are connected to data output ports 15-1–15-m of the processor units 10-1–10-m, respectively.

First output ports 13 of the network subsystems $NS_{11}$, $NS_{12}$, ..., $NS_{1m}$ are connected to data input ports 16-1–16-m of the processor unit sets 10-1–10-m, respectively.

The first output ports 13 of the network subsystems $NS_{ij}$ except the network subsystems $NS_{11}$, $NS_{12}$, ..., $NS_{1m}$ are connected to second input ports 12 of the network subsystems $NS_{(i-1)j}$ except the network subsystems $NS_{m1}$, $NS_{m2}$, ..., $NS_{mm}$, respectively.

Namely, the first output ports 13 of the network subsystems $NS_{ij}$ except the network subsystems $NS_{11}$, $NS_{12}$, ..., $NS_{1m}$ are connected to the second input ports 12 of the network subsystems $NS_{(i-1)j}$ positioned just above the network subsystems $NS_{ij}$, respectively.

The second output ports 14 of the network subsystems $NS_{1j}$ belonging to the respective network subgroups $NSG_1$, $NSG_2$, ..., $NGS_{m-1}$ and the second output ports 14 of arbitrary m–2 network subsystems among the network subsystems $NS_{2j}$, $NS_{3j}$, ..., $NS_{mj}$ belonging to the respective network subgroups $NSG_1$, $NSG_2$, ..., $NSG_{m-1}$ are connected to the first input ports 11 of arbitrary network subsystems $NS_{2j}$, $NS_{3j}$, ..., $NS_{mj}$ belonging to the respective neighbouring network subgroups $NSG_2$, $NSG_3$, ..., $NSG_m$, respectively.

Namely, the second output ports 14 of the network subsystems $NS_{1j}$ belonging to the network subgroups $NSG_1$, $NSG_2$, ..., $NSG_{m-1}$ are connected to the first input ports 11 of arbitrary network subsystems $NS_{2j}$, $NS_{3j}$, ..., $NS_{mj}$ belonging to the respective neighbouring network subgroups $NSG_2$, $NSG_3$, ..., $NSG_m$, respectively. At the same time, the second output ports 14 of arbitrary m–2 network subsystems except the network subsystems connected to the second output ports 14 of the network subsystems $NS_{1j}$ among the network subsystems $NS_{2j}$, $NS_{3j}$, ..., $NS_{mj}$ belonging to the respective network subgroups $NSG_1$, $NSG_2$, ..., $NSG_{m-1}$ are connected to the first input ports 11 of arbitrary network subsystems $NS_{2j}$, $NS_{3j}$, ..., $NS_{mj}$ belonging to the respective neighbouring network subgroups $NSG_2$, $NSG_3$, ..., $NSG_m$, respectively.

Further, the second output ports 14 of the network subsystem $NS_{1m}$ belonging to the network subgroup $NSG_m$ and the second output ports 14 of arbitrary m–2 network subsystems among the network subsystems $NS_{2m}$, $NS_{3m}$, ..., $NS_{mm}$ belonging to the network subgroup $NSG_m$ are connected to the first input ports 11 of arbitrary network subsystems $NS_{21}$, $NS_{31}$, ..., $NS_{m1}$ belonging to the network subgroup $NSG_1$, respectively.

In other words, the second output port 14 of the network subsystem $NS_{1m}$ belonging to the network subgroup $NSG_m$ is connected to the first input port 11 of an arbitrary network subsystem among the network subsystems $NS_{21}$, $NS_{31}$, ..., $NS_{m1}$ belonging to the network subgroup $NSG_1$. In addition, the second output ports 14 of arbitrary m–2 network subsystems among the network subsystems $NS_{2m}$, $NS_{3m}$, ..., $NS_{mm}$ belonging to the network subgroup $NSG_m$ are connected to the first input ports 11 of arbitrary network subsystems among the network subsystems $NS_{21}$, $NS_{31}$, ..., $NS_{m1}$ belonging to the network subgroup $NSG_1$ except the network subsystem whose first input port 11 is connected to the second output port 14 of the network subsystem $NS_{1m}$.

The network system for a parallel processor system according to the third embodiment operates as follows.

For instance, a communication is carried out between one of the n processor units included in the processor unit 10-1 as a sender and one of the processor units except the sender processor unit included in the processor unit 10-1–10-m, data having predetermined address information, that is, destination information, is outputted as a destination undecided data to the network subsystem $NS_{11}$ through the data input port 15-1.

The address information from the processor unit sets 10-1 is inputted to a group address judging unit 17 of the network subsystem $NS_{11}$ through the first input port 11 shown in FIG. 1. The group address judging unit 17 makes a judgement on the inputted address information as to whether it is addressed a processor units belonging to its own group, that is, a processor unit included in the processor unit set 10-1, or not.

If the inputted address information is judged by the group address judging unit 17 to be addressed to a processor unit included in the processor unit 10-1, a network switch unit 18 executes a switching to a processor unit to which said address information is addressed to output said destination undecided data as a destination decided data to a destination decided data contention unit 19.

The destination decided data contention unit 19 is applied the destination decided data from the network switching unit 18 and another destination decided data from the network subsystem $NS_{21}$ through the second input port 12. If the applied two destination decided data have the same destination, the destination decided data contention unit 19 outputs them in order of priority to the processor unit set 10-1 through the first output port 13.

If the inputted address information is not addressed to any one of the processor units included in the processor unit set 10-1, the group address judging unit 17 outputs said destination undecided data to an arbitrary network subsystem among the network subsystems $NS_{22}, NS_{32}, \ldots, NS_{m2}$ belonging to the network subgroup $NSG_2$ through the second output ports 14. An address judgement is again made on said destination undecided data in the following network subsystem inputted said destination undecided data in the same manner.

If the address information included in the data inputted to the network subsystem is judged to be addressed to a processor units included in the processor unit set 10-2 of its own group, said destination undecided data is outputted as a destination decided data to the processor unit set 10-2 via a network subsystem positioning closer to the processor unit set 10-2 than the network subsystem having received said data.

In other words, the above destination decided data is eventually outputted to the addressed processor unit via the data input port 16-2 of the processor unit set 10-2.

If the address information of the data is judged in, for example, the network subsystem $NS_{(m-1)2}$ to be addressed to a processor unit belonging to its own group, said data becomes a destination decided data to be outputted to the processor unit set 10-2 via the network subsystems $NS_{(m-2)2}, NS_{(m-3)2}, \ldots, NS_{12}$.

Further, the address information of the data inputted to the network subsystem is judged not to be addressed to any processor unit included in the processor unit set 10-2 of its own group, said destination undecided data is outputted to the arbitrary network subsystem among the network subsystems $NS_{23}, NS_{33}, \ldots, NS_{m3}$ belonging to the network subgroup $NSG_3$.

The destination undecided data inputted to the network subsystem $NS_{22}, NS_{33}, \ldots,$ or $NS_{m3}$ through the first input port 11 is fed to the group address judging unit 17. The group address judging unit 17 makes a judgement on the inputted data as mentioned above.

In the same manner, the address judgement is successively made in arbitrary m-2 network subsystems among the network subsystems $NS_{2j}, NS_{3j}, \ldots, NS_{mj}$ belonging to the respective network subgroups $NSG_4, NSG_5, \ldots, NSG_m$ until said destination undecided data having the predetermined address information becomes a destination decided data. When the destination undecided data becomes a destination decided data, said destination decided data is outputted to a processor unit that is a recipient via network subsystems positioning closer to a processor unit set of the recipient processor unit than the network subsystem having received said data.

If a destination of the destination undecided data is not decided in the group judging unit 17 in the arbitrary network subsystem belonging to the network subgroup $NSG_m$, the sender processor unit is informed of a transmission error and said destination undecided data is disposed.

In the case of a transmission from a processor unit as a sender included in the processor unit set other than the processor unit included in the processor unit set 10-1, a destination decided data is finally outputted to an addressed processor unit as same as above.

If the address information included in the data inputted to one of the network subsystems $NS_{1m}, NS_{3m}, NS_{4m}, \ldots, NS_{2m}$ is not addressed to any one of the processor units included in the processor unit set 10-m, said destination undecided data is outputted to a corresponding network subsystem $NS_{m1}, NS_{21}, NS_{31}, \ldots,$ or $NS_{(m-1)1}$ from the second output port 14.

In which case, it is a matter of course that if the destination of the destination undecided data is still undecided, the sender processor unit is informed on a transmission error and said destination undecided data is disposed.

As above, the third embodiment has, as well as the first and second embodiments, advantages that occurrence of contention in communication between the processor units is suppressed to a minimum so as to improve throughput of the network. In addition, it is possible to form, without difficulty, the network system with elements of the number depending on a scale of the system, from a small-scaled system to a large-scaled system.

The network subsystems are mutually connected by data cables so that a large-scaled network system becomes feasible without decreasing a processing rate in the entire system.

(d) Description of Fourth Embodiment

Figure 6:
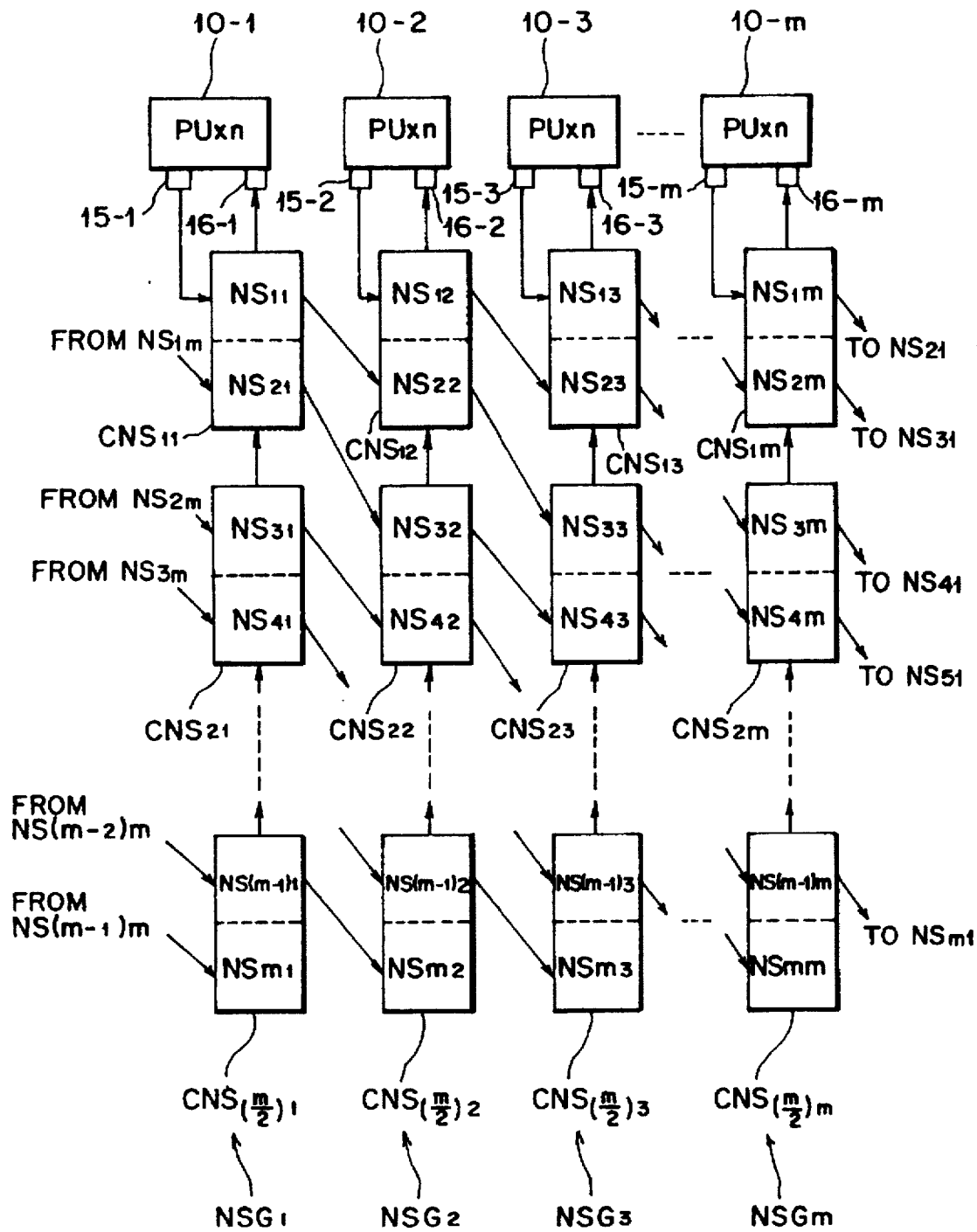
FIG. 6 is a block diagram of a network system for a parallel processor system according to a fourth embodiment of this invention.

FIG. 6 is a block diagram of a network system for a parallel processor system according to a fourth embodiment of this invention. In the network system for a parallel processor system of the fourth embodiment shown in FIG. 6, a network subsystem $NS_{1j}$ is combined with a network subsystem $NS_{2j}$, a network subsystem $NSG_{3j}$ is combined with a network subsystem $NS_{4j}, \ldots,$ and a network subsystem $NS_{(m-1)j}$ is combined with a network subsystem $NS_{mj}$ within the same network subgroup $NSG_j$ (where j is a natural number from 1 to m that is an even number).

The network system for a parallel processor system shown in FIG. 6 is configured into a matrix of (m/2)×m made up of such combined network subsystems $CN_{pj}$ (where p is a natural number of 1 to m/2). Each of the combined network subsystems $CNS_{pj}$ has a structure as shown in FIG. 7.

Figure 7:
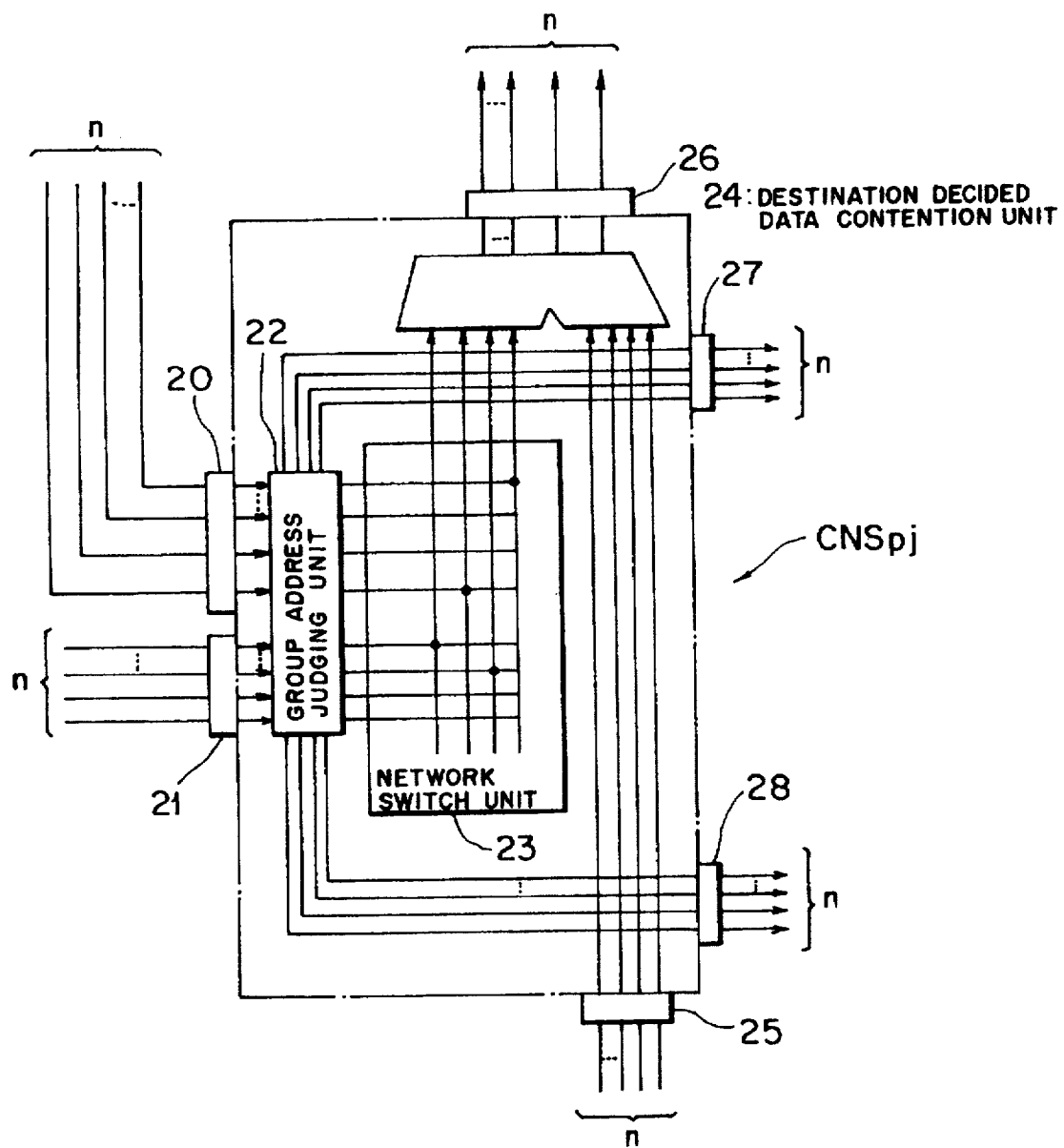
FIG. 7 is a block diagram of a network subsystem for a parallel processor system according to the fourth embodiment of this invention.

In FIG. 7, reference numerals 20 and 21 denote first input ports. The first input port 20 allows a network subsystem positioning on a side closer to its processor unit set in the combined network subsystem included in the same network subgroup to receive a destination undecided data. The another first input port 21 allows a combined network subsystem positioning on a side farther from the processor unit in the same combined network subsystem to receive a destination undecided data.

Said destination undecided data is outputted from a processor unit set 10-j (i.e., n processor units belonging to its own group) belonging to its own group in the processor unit sets 10-1–10m, or a combined network subsystem belonging to another network subgroup.

A second input port 25 is served to receive a destination decided data from a combined network subsystem positioning father from a processor unit in its own network subgroup.

A group address judging unit 22 makes a judgement as to whether the destination undecided data supplied through the first input port 20 or 21 is addressed to a processor unit belonging to its own group or not. This group address judging unit 22 is configured by combining two elements each having the same function as the group address judging unit 17 of the network subsystem shown in FIG. 1.

A network switch unit 23 is also formed by combining two elements each having the same function as the network switch unit 18 of the network subsystem shown in FIG. 1.

When the group address judging unit 22 judges that the destination undecided data supplied through the first input port 20 or 21 is addressed to a processor unit belonging it its own group, the network switch unit 23 carries out a switching to the addressed processor unit, then outputs said destination undecided data as a destination decided data. The network switch unit 23 is formed as a crossbar network of, for example, 2n×n.

A destination decided data contention unit 24 is applied the destination decided data from the network switching unit 23 and another destination decided data through the second input port 25 to solve contention if the contention is generated due to presence of the two different destination decided data having the same destination, then outputs them in order.

A first port 26 outputs a destination decided data supplied from the destination decided data contention unit 24 to a processor unit belonging to its own group, or a network subsystem positioning closer to a processor unit set or a processor unit set in its own network subgroup.

When the group address judging unit 22 judges that the destination undecided data is not addressed to any processor unit belonging to its own group, second output ports 27,28 are served to output said destination undecided data as it is to network subsystems in another network subgroup.

The second output port 27 is served to output a destination undecided data from a network subsystem positioning on the side closer to its processor unit set in a combined network subsystem in the same network subgroup. The second output port 28 is, on the other hand, served to output a destination undecided data from a network subsystem positioning on a side farther from its processor unit set in the same combined network subsystem.

Each of the network subsystems $NS_{ij}$, $NS_{3j}$, ..., $NS_{(m-1)j}$ as an element positioning on the side closer to its own processor unit set in the combined network subsystem $CNS_{pj}$ comprises the first input port 20, the group address judging unit 22, the network switching unit 23, the destination decided data contention unit 24, the second input port 25, the first output port 26 and the second output port 27.

Likewise, each of the network subsystems $NS_{2j}$, $NS_{4j}$, ... $NS_{mj}$ as an element positioning on the side farther from its own processor unit set in the combined network subsystem $CNS_{pj}$ comprises the first input port 21, the group address judging unit 22, the network switching unit 23, the destination decided data contention unit 24, the second input port 25, the first output port 26 and the second output port 28.

As shown in FIG. 6, data output ports 15-1–15-m of the respective processor unit sets 10-1–10-m are connected to the first input ports 20 of the combined network subsystems $CNS_{11}$–$CNS_{1m}$, respectively. Data input ports 16-1–16-m of the respective processor unit sets 10-1–10-m are connected to the first output ports 26 of the combined network subsystems $CNS_{11}$, $CNS_{12}$, ..., $CNS_{1m}$, respectively.

The first output ports 26 of the combined network subsystems $CNS_{pj}$ except the network subsystems $CNS_{11}$, $CNS_{12}$, ..., $CNS_{1m}$ are connected to the second input ports 25 of the network subsystems $NS_{(p-2)j}$ except the combined network subsystems $CNS_{(m/2)1}$, $CNS_{(m/2)2}$, ..., $CNS_{(m/2)m}$, respectively.

The second output ports 27 of the network subsystems $CNS_{pj}$, except the combined network subsystems $CNS_{1m}$, $CNS_{2m}$, ..., $CNS_{(m/2)-1}$ are connected to the first input ports 21 of the combined network subsystems $CNS_{p(j+1)}$, respectively. The second output ports 28 of the network subsystems $CNS_{pj}$ except the combined network subsystems $CNS_{(m/2)1}$, $CNS_{(m/2)2}$, ..., $CNS_{(m/2)m}$ and the combined network subsystems $CNS_{1m}$, $CNS_{2m}$, ..., $CNS_{(m/2)-1m}$ are connected to the first input ports 20 of the the network subsystems $CNS_{(p+1)(j+1)}$ except the combined network subsystems $CNS_{11}$, $CNS_{12}$, ..., $CNS_{1m}$, respectively.

The second output ports 27 of the combined network subsystems $CNS_{1m}$, ..., $CNS_{(m/2)m}$ are connected to the first input ports 21 of the combined network subsystems $CNS_{11}$, ..., $CNS_{(m/2)1}$, respectively. The second output ports 28 of the combined network subsystems $CNS_{1m}$, ..., $CNS_{(m/2)-1m}$ are connected to the first input ports 20 of the combined network subsystems $CNS_{21}$, ..., $CNS_{(m/2)1}$, respectively.

With the above structure, the network system for a parallel processor-system according to the fourth embodiment operates as follows.

For instance, in the case of a communication between one of the n processor units included in the processor unit set 10-1 and another processor unit included in the processor unit set 10-1 or another processor unit sets except the processor unit sets 10-1 shown in FIG. 6, a data having predetermined address information (destination information) is fed as a destination undecided data to the combined network subsystem $CNS_{11}$, through the data input port 15-1.

The address information included in the data is supplied from the processor unit set 10-1 to the group address judging unit 22 in the combined network subsystem $CNS_{11}$, through the first input port 20 as shown in FIG. 7. The group address judging unit 22 makes a judgement as to whether the address information of the inputted data is addressed to a processor unit belonging to its own group, that is, a processor unit included in the processor unit set 10-1, or not.

When the group address judging unit 22 judges that the inputted address information is addressed to a processor unit included in the processor unit set 10-1, the network switch unit 23 carries out a switching to the processor unit to which said address information is addressed, then outputs said destination undecided data as a destination decided data to the destination decided data contention unit 24.

The destination decided data contention unit 24 is applied the destination decided data from the network switching unit 23 and another destination decided data from the combined network subsystem $CNS_{21}$ through the second input port 25 to output them in order of priority to the processor unit set 10-1 through the first output port 26.

If the address information of the inputted data is not addressed to any processor unit included in the processor unit set 10-1, the inputted data is outputted as a destination undecided data to the combined network subsystem $CNS_{12}$ through the second output port 27, where the same address judgement is made on said destination undecided data as same as in the combined network subsystem $CNS_{11}$.

In the combined network subsystem $CNS_{12}$, the address information of the inputted data is applied to the group address judging unit 22 through the first input port 21. If this destination undecided data is addressed to a processor unit included in the processor unit set 10-2 as its own group, said destination undecided data is outputted as a destination decided data to the processor unit set 10-2.

When the address information of the data inputted to the combined network subsystem $CNS_{12}$ is not addressed to any processor unit included in the processor unit set 10-2, this destination undecided data is output as it is to the combined network subsystem $CNS_{23}$ through the second output port 28. In the combined network subsystem $CNS_{23}$, an address judgement is made as same as in the combined network subsystem $CNS_{11}$.

More specifically, the address information of the data inputted to the combined network subsystem $CNS_{23}$ through the first input port 20 is fed to the group address judging unit 22. If this destination undecided data is addressed to a processor unit included in the processor unit set 10-3 as its own group, said destination undecided data is outputted as a destination decided data to the processor unit set 10-3.

In the same manner, the address judgement continues in the following combined network subsystems $CNS_{24}$, ..., $CNS_{(m/2)m}$ belonging to the respective neighbouring network subgroups $NSG_j$ until the destination undecided data having the predetermined address information becomes a destination decided data. When the destination undecided data becomes a destination decided data, said destination decided data is finally outputted to an objective processor unit, that is, a receiver processor unit, designated by the predetermined address information.

In the case of a communication transmitted from a processor unit included in a processor unit set except the processor unit set 10-1, a destination decided data is eventually outputted to a receiver processor unit in the same manner as above case. In which case, if address information included in the destination undecided data inputted to the combined network subsystem $CNS_{1m}$, $CNS_{2m}$, . . . , or $CNS_{(m/2)m}$ belonging to the network subgroup $NSG_m$ is not addressed to any processor unit included in the processor unit set 10-m, said destination undecided data is outputted to the corresponding combined network subsystem $CNS_{11}$, $CNS_{21}$, . . . , or $CNS_{(m/2)1}$ belonging to the network subgroup $NSG_1$.

When the destination of the destination undecided data inputted to the combined network subsystem $CNS_{(m/2)1}$, $CNS_{(m/2)2}$, . . . , or $CNS_{(m/2)m}$ through the first input port 21 is not decided in the group address judging unit 22, the processor unit that is a sender is informed of a transmission error and said destination undecided data is disposed.

As above, the fourth embodiment has advantages that it is possible to largely reduce a quantity of the hardware since the network system is formed with combined network subsystems, thereby contributing to a reduction in scale of the system, in addition to the advantages that are provided by the first, second and third embodiments.

As a mode to combine the combined network subsystems $CNS_{pq}$, it is possible to combine arbitrary network subsystems with each other within the same network subgroup. As a mode of the connection between the neighbouring network subgroups, it is also possible to connect arbitrary combined network subgroups to each other.

(e) Description of Fifth Embodiment

Figure 8:
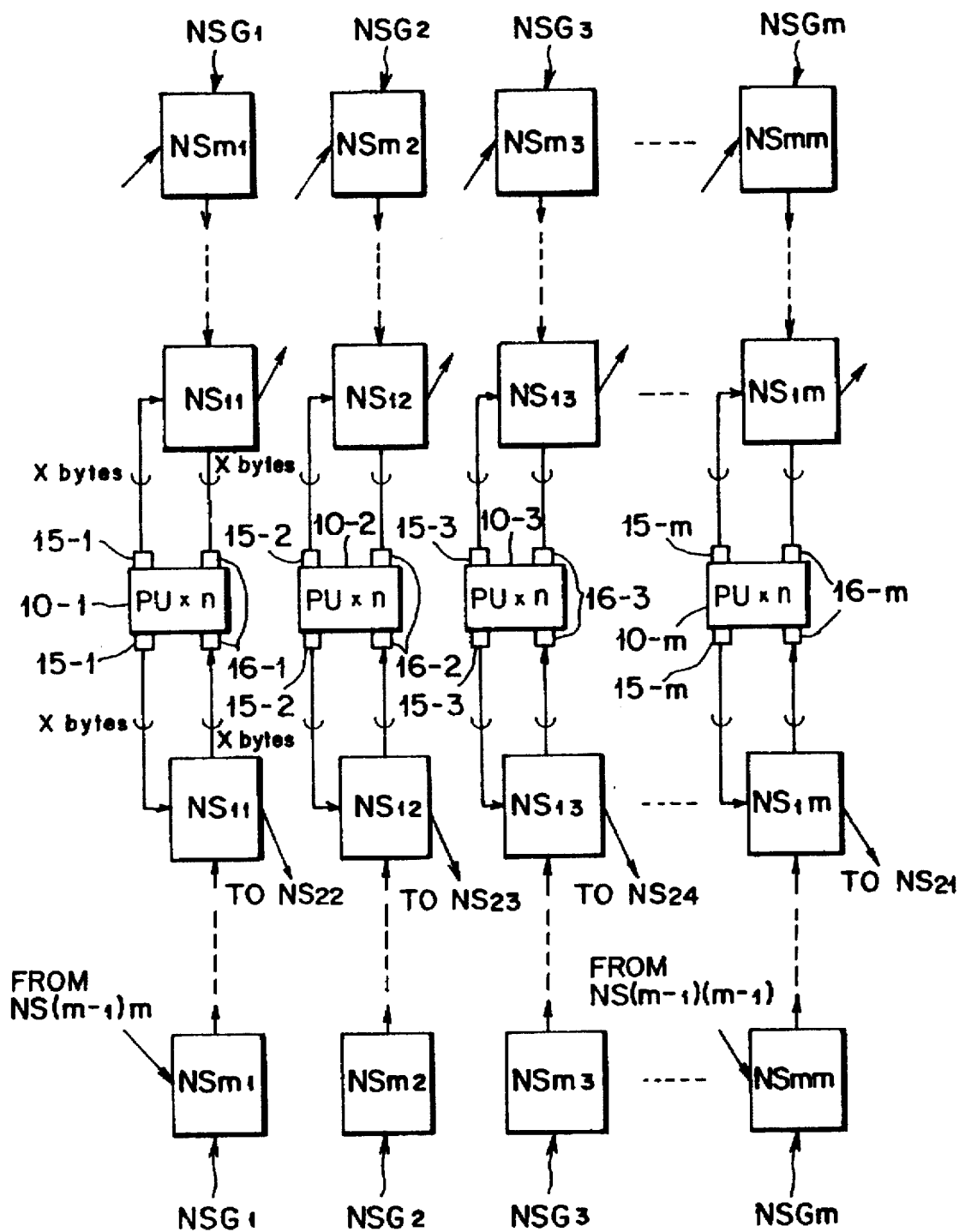
FIG. 8 is a block diagram of a network system for a parallel processor system according to a fifth embodiment of this invention.
Figure 9:
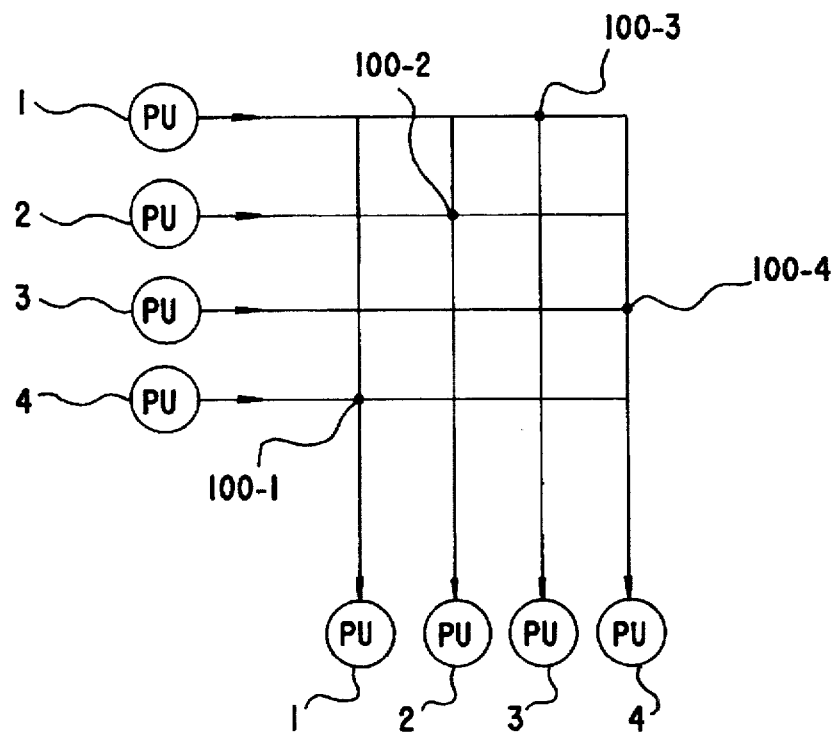
FIG. 9 is an illustration showing a concept of a crossbar network.
Figure 10:
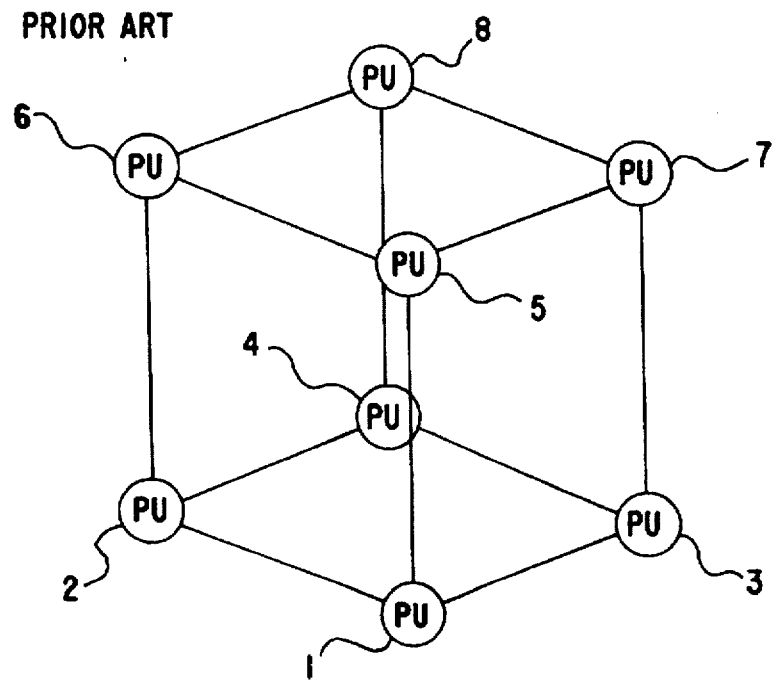
FIG. 10 is an illustration showing a concept of a hypercube network.
Figure 11:
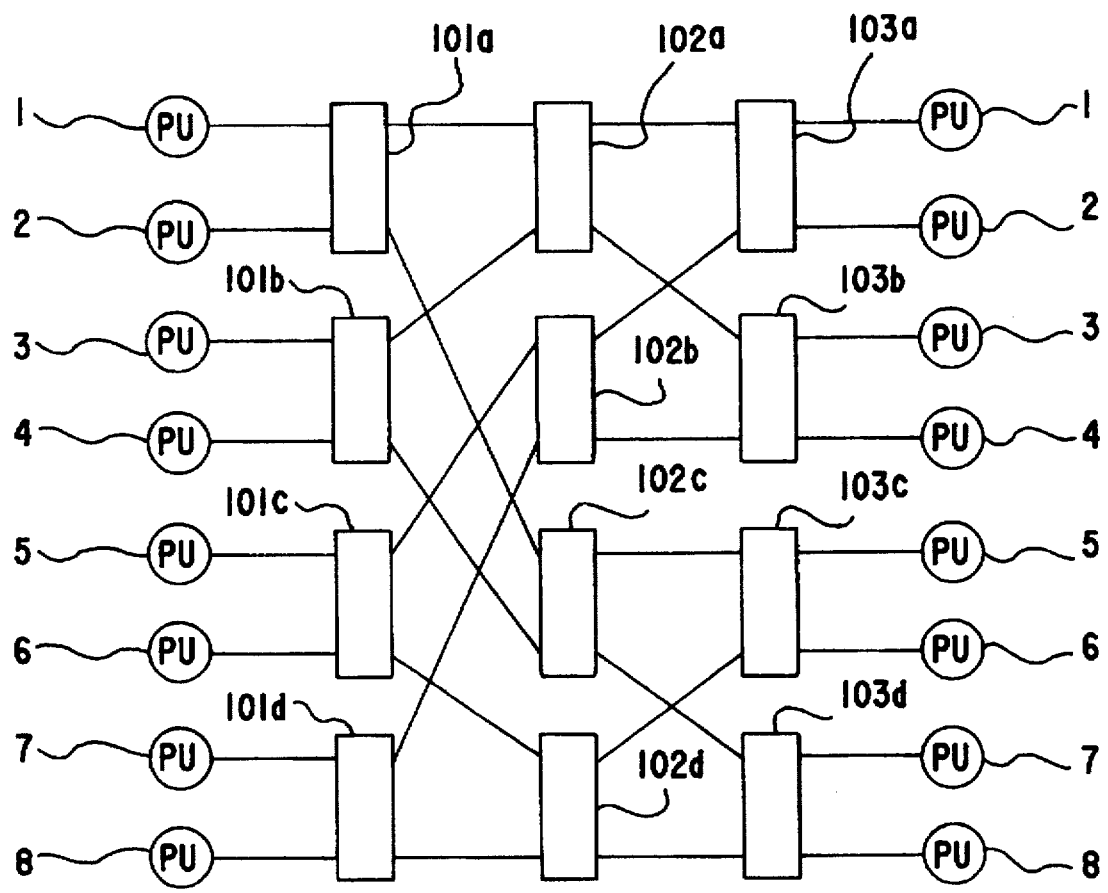
FIG. 11 is an illustration showing a concept of an omega network.
Figure 12:
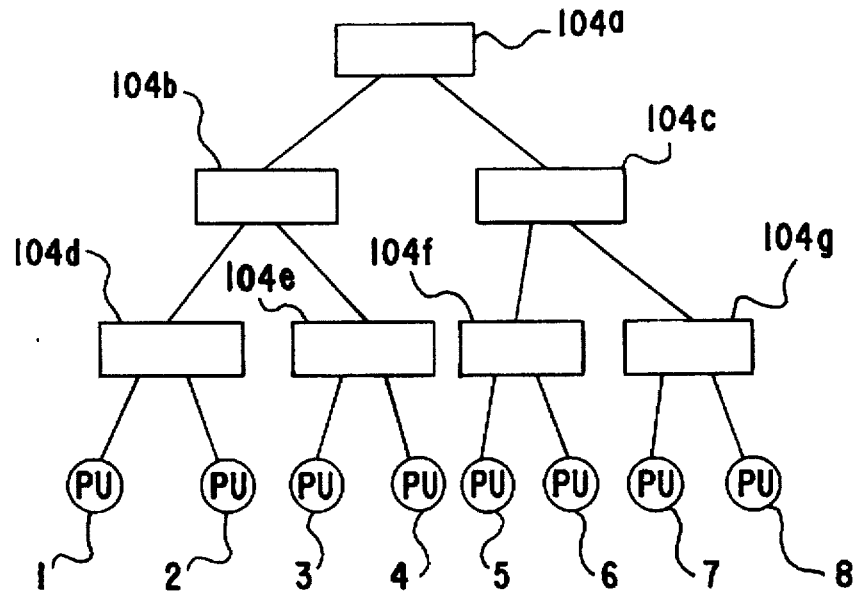
FIG. 12 is an illustration showing a concept of a tree network.
Figure 13:
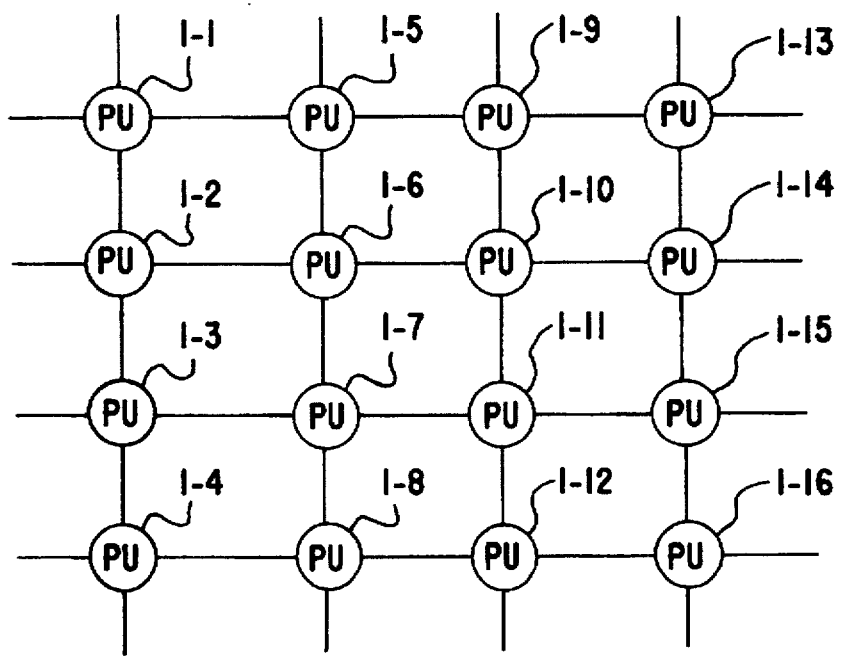
FIG. 13 is an illustration showing a concept of an array network.

FIG. 8 is a block diagram of a network system for a parallel processor system according to a fifth embodiment of this invention. The network system for a parallel processor system shown in FIG. 8 has network subsystems $NS_{ij}$ (where i and j are natural numbers from 1 to m) whose internal structure is identical to that of the network subsystem according to the first, second and third embodiment shown in FIG. 1. A different point in the fifth embodiment is that the network subsystems $NS_{ij}$ are connected to each other in a different fashion.

More specifically, a couple of network groups each consisting of the network subgroups $NSG_1$, $NSG_2$, $NGS_3$, . . . , $NSG_m$ are connected in parallel to the processor unit sets 10-1, 10-2, 10-3, . . . , 10-m. Each of the network groups has the same function as the network group according to the first embodiment.

With the above arrangement, each of the network group in the network system according to the fifth embodiment operates in the same manner as the first embodiment. If each network subsystem $NS_{ij}$ is configured to have x bytes, it is possible to simultaneously transmit a data for x×2 bytes by connecting the two network subgroups in parallel.

The fifth embodiment has an advantage that much more data can be transmitted simultaneously since a couple of the network groups are connected in parallel, thereby increasing the processing rate, in addition to the advantages provided by the first, second and third embodiments.

In the fifth embodiment, the network subgroups $NSG_j$ connected in parallel to the respective processor unit sets 10-1–10-m may be connected to each other in a fashion described in the second, or third embodiment.

According to the fifth embodiment, a couple of the network groups are connected in parallel to the processor unit set 10-1–10-m. It is, however, possible to connect a plurality of network subgroups more than two to the processor unit sets at the same time.

(f) Others

In the above embodiments, the network switch unit 18,23 in the network subsystem is formed by a crossbar network (crossbar switch). The present invention is not limited to the above example. It is, for example, possible to form the network switch unit 18,23 by an omega network, a tree network, an array network or the like.

What is claimed is:

1. A network system for a parallel processor system comprising:

m×m network subsystems $NS_{ij}$ for the parallel processor system, where i and j are natural numbers from 1 to m, being configured into a matrix, each of which network subsystems comprises:

a first input port receiving a destination undecided data to be transmitted from one of a plurality of processor units included in a processor unit set belonging to its own group or another network subsystem for the parallel processor system to another processor unit belonging to its own group or a processor unit belonging to another group;

a second input port receiving a destination decided data from another network subsystem for the parallel processor system;

a group address judging unit making a judgement on said destination undecided data inputted through the first input port as to whether said destination undecided data is addressed to a processor unit belonging to its own group or not;

a network switch unit conducting a switching to the processor unit to which said destination undecided data are addressed when the group address judging unit judges that said destination undecided data is addressed to said processor unit belonging to its own group to output said destination undecided data as a destination decided data;

a destination decided data contention unit having applied said destination decided data fed from the network switch unit and said another destination decided data from the second input port to solve contention when said two destination decided data have the same destination so that the contention generates between said two destination decided data, and outputting said two destination decided data;

a first output port outputting said destination decided data supplied from the destination decided data contention unit to said addressed processor unit or another network subsystem for the parallel processor system; and a second output port outputting said destination undecided data as it is to another network subsystem for the parallel processor system when said destination undecided data is judged by the group address judging unit to be addressed to a processing unit belonging to another group;

the m network subsystems $NS_{ij}$, $NS_{2j}$, . . . , $NS_{mj}$ forming a network subgroup $NSG_j$, and m sets of the network subgroups $NSG_j$ being formed in said network system;

the first input ports of the network subsystems $NS_{11}$, $NS_{12}$, . . . , $NS_{1m}$ belonging to the respective m network subgroups $NSG_1$–$NSG_m$ each being connected to data output ports of n processor units;

the first output ports of the network subsystems $NS_{11}$, $NS_{12}, \ldots, NS_{1m}$ each being connected to processor unit data input ports of the n processor units;

the first output ports of network subsystems $NS_{ij}$ except the network subsystems $NS_{11}, NS_{12}, \ldots, NS_{1m}$ being connected to the second input ports of the network subsystems $NS_{(i-1)j}$ except the network subsystems $NS_{m1}, NS_{m2}, \ldots, NS_{mm}$, respectively;

the second output ports of the network subsystems $NS_{ij}$ except the network subsystems $NS_{m1}, NS_{m2}, \ldots, NS_{mm}$ and the network subsystems $NS_{1m}, NS_{2m}, \ldots, NS_{(m-1)m}$ being connected to the first input ports of the network subsystems $NS_{(i+1)(j+1)}$ except the network subsystems $NS_{11}, NS_{12}, \ldots, NS_{1m}$, respectively;

the second output ports of the network subsystems $NS_{1m}, NS_{2m}, \ldots, NS_{(m-1)m}$ being connected to the first input ports of the network subsystems $NS_{21}, NS_{31}, \ldots, NS_{m1}$, respectively.

2. A network system for a parallel processor system according to claim 1, wherein the second input port, the second output port and the destination decided data contention unit are omitted in the network subsystems $NS_{m1}, NS_{m2}, \ldots, NS_{mm}$.

3. A network system for a parallel processor system according to claim 2, wherein the network subsystems $NS_{1j}, NS_{2j}, \ldots, NS_{mj}$ belonging to the same network subgroup $NSG_j$ are arbitrarily combined with each other, and in each of the combined network subsystems, the group address judging units and the network switch units are respectively combined with each other and only one destination decided data contention unit is commonly used.

4. A network system for a parallel processor system according to claim 3, wherein the network switching unit is formed as a crossbar switch.

5. A network system for a parallel processor system according to claim 3, wherein in the network subgroup $NSG_j$ including the network subsystems $NS_{1j}, NS_{2j}, \ldots, NS_{mj}$, the network subsystems $NS_{1j}$ and $NS_{2j}$, $NS_{3j}$ and $NS_{4j}, \ldots$, $NS_{(m-1)j}$ and $NS_{mj}$ are respectively combined with each other.

6. A network system for a parallel processor system according to claim 5, wherein the network switching unit is formed as a crossbar switch.

7. A network system for a parallel processor system according to claim 5, wherein plural sets of network groups each comprising said m sets of the network subgroups $NSG_1$–$NGS_m$ are connected in parallel to the processor unit sets each including the n processor units.

8. A network system for a parallel processor system according to claim 7, wherein the network switching unit is formed as a crossbar switch.

9. A network system for a parallel processor system according to claim 3, wherein plural sets of network groups each comprising said m sets of the network subgroups $NSG_1$–$NGS_m$ are connected in parallel to the processor unit sets each including the n processor units.

10. A network system for a parallel processor system according to claim 9, wherein the network switching unit is formed as a crossbar switch.

11. A network system for a parallel processor system according to claim 2, wherein plural sets of network groups each comprising said m sets of the network subgroups $NSG_1$–$NGS_m$ are connected in parallel to the processor unit sets each including the n processor units.

12. A network system for a parallel processor system according to claim 11, wherein the network switching unit is formed as a crossbar switch.

13. A network system for a parallel processor system according to claim 2, wherein the network switching unit is formed as a crossbar switch.

14. A network system for a parallel processor system according to claim 1, wherein the network subsystems $NS_{1j}, NS_{2j}, \ldots, NS_{mj}$ belonging to the same network subgroup $NSG_j$ are arbitrarily combined with each other, and in each of the combined network subsystems, the group address judging units and the network switch units are respectively combined with each other and only one destination decided data contention unit is commonly used.

15. A network system for a parallel processor system according to claim 14, wherein the network switching unit is formed as a crossbar switch.

16. A network system for a parallel processor system according to claim 14, wherein plural sets of network groups each comprising said m sets of the network subgroups $NSG_1$–$NGS_m$ are connected in parallel to the processor unit sets each including the n processor units.

17. A network system for a parallel processor system according to claim 16, wherein the network switching unit is formed as a crossbar switch.

18. A network system for a parallel processor system according to claim 14, wherein in the network subsystems $NS_{1j}, NS_{2j}, \ldots, NS_{mj}$ belonging to the same network subgroup $NSG_j$, the network subsystems $NS_{1j}$ and $NS_{2j}$, $NS_{3j}$ and $NS_{4j}, \ldots, NS_{(m-1)j}$ and $NS_{mj}$ are respectively combined with each other.

19. A network system for a parallel processor system according to claim 18, wherein the network switching unit is formed as a crossbar switch.

20. A network system for a parallel processor system according to claim 18, wherein plural sets of network groups each comprising said m sets of the network subgroups $NSG_1$–$NGS_m$ are connected in parallel to the processor unit sets each including the n processor units.

21. A network system for a parallel processor system according to claim 20, wherein the network switching unit is formed as a crossbar switch.

22. A network system for a parallel processor system according to claim 1, wherein plural sets of network groups each comprising said m sets of the network subgroups $NSG_1$–$NGS_m$ are connected in parallel to the processor unit sets each including the n processor units.

23. A network system for a parallel processor system according to claim 22, wherein the network switching unit is formed as a crossbar switch.

24. A network system for a parallel processor system according to claim 1, wherein the network switching unit is formed as a crossbar switch.

25. A network system for a parallel processor system comprising:

m×m network subsystems $NS_{ij}$ for a parallel processor system, where i and j are natural numbers from 1 to m, being configured into a matrix, each of which network subsystems comprises:

a first input port receiving a destination undecided data to be transmitted from one of a plurality of processor units included in a processor unit set belonging to its own group or another network subsystem for the parallel processor system to another processor unit belonging to its own group or a processor unit belonging to another group;

a second input port receiving a destination decided data from another network subsystem for the parallel processor system;

a group address judging unit making a judgement on said destination undecided data inputted through the first input port as to whether said destination undecided data is addressed to a processor unit belonging to its own group or not;

a network switch unit conducting a switching to the processor unit to which said destination undecided data are addressed when the group address judging unit judges that said destination undecided data is addressed to said processor unit belonging to its own group to output said destination undecided data as a destination decided data;

a destination decided data contention unit having applied said destination decided data fed from the network switch unit and said another destination decided data from the second input port to solve contention when said two destination decided data have the same destination so that the contention generates between said two destination decided data, and outputting said two destination decided data;

a first output port outputting said destination decided data supplied from the destination decided data contention unit to said addressed processor unit or another network subsystem for the parallel processor system; and a second output port outputting said destination undecided data as it is to another network subsystem for the parallel processor system when said destination undecided data is judged by the group address judging unit to be addressed to a processing unit belonging to another group;

the m network subsystems $NS_{1j}, NS_{2j}, \ldots, NS_{mj}$ forming a network subgroup $NSG_j$, and m sets of the network subgroups $NSG_j$ being formed in said network system;

the first input ports of the network subsystems $NS_{11}, NS_{12}, \ldots, NS_{1m}$ belonging to the respective m sets of network subgroups $NSG_1-NSG_m$ each being connected to processor unit data output ports of n processor units;

the first output ports of the network subsystems $NS_{11}, NS_{12}, \ldots, NS_{1m}$ each being connected to processor unit data input ports of the n processor units;

the first output ports of the network subsystems $NS_{ij}$ except the network subsystems $NS_{11}, NS_{12}, \ldots, NS_{1m}$ being connected to the second input ports of the network subsystems $NS_{(i-1)j}$ except the network subsystems $NS_{m1}, NS_{m2}, \ldots, NS_{mm}$, respectively;

the second output ports of the network subsystems $NS_{11}, NS_{12}, \ldots, NS_{1m}$ being connected to the first input ports of the network subsystems $NS_{m2}, NS_{m3}, \ldots, NS_{mm}$, respectively;

the second output ports of the network subsystems $NS_{ij}$ except the network subsystems $NS_{11}, NS_{12}, \ldots, NS_{1m}$ and the network subsystems $NS_{2m}, NS_{3m}, \ldots, NS_{mm}$ being connected to the first input ports of the network subsystems $NS_{(i-1)(j+1)}$ except the network subsystems $NS_{11}, NS_{12}, \ldots, NS_{1m}$, respectively;

the second output ports of the network subsystems $NS_{1m}, NS_{3m}, \ldots, NS_{mm}$ being connected to the first input ports of the network subsystems $NS_{m1}, NS_{21}, NS_{31}, \ldots, NS_{(m-1)1}$, respectively.

26. A network system for a parallel processor system according to claim 25, wherein the network subsystems $NS_{1j}, NS_{2j}, \ldots, NS_{mj}$ belonging to the same network subgroup $NSG_j$ are arbitrarily combined with each other, and in each of the combined network subsystems, the group address judging units and the network switch units are respectively combined with each other and only one destination decided data contention unit is commonly used.

27. A network system for a parallel processor system according to claim 26, wherein the network switching unit is formed as a crossbar switch.

28. A network system for a parallel processor system according to claim 26, wherein plural sets of network groups each comprising said m sets of the network subgroups $NSG_1-NGS_m$ are connected in parallel to the processor unit sets each including the n processor units.

29. A network system for a parallel processor system according to claim 28, wherein the network switching unit is formed as a crossbar switch.

30. A network system for a parallel processor system according to claim 26, wherein in the network subgroup $NSG_j$ including the network subsystems $NS_{1j}, NS_{2j}, \ldots, NS_{mj}$, the network subsystems $NS_{1j}$ and $NS_{2j}, NS_{3j}$ and $NS_{4j}, \ldots, NS_{(m-1)j}$ and $NS_{mj}$ are respectively combined with each other.

31. A network system for a parallel processor system according to claim 30, wherein the network switching unit is formed as a crossbar switch.

32. A network system for a parallel processor system according to claim 30, wherein plural sets of network groups each comprising said m sets of the network subgroups $NSG_1-NGS_m$ are connected in parallel to the processor unit sets each including the n processor units.

33. A network system for a parallel processor system according to claim 32, wherein the network switching unit is formed as a crossbar switch.

34. A network system for a parallel processor system according to claim 25, wherein plural sets of network groups each comprising said m sets of the network subgroups $NSG_1-NGS_m$ are connected in parallel to the processor unit sets each including the n processor units.

35. A network system for a parallel processor system according to claim 34, wherein the network switching unit is formed as a crossbar switch.

36. A network system for a parallel processor system according to claim 25, wherein the network switching unit is formed as a crossbar switch.

37. A network system for a parallel processor system comprising:

m×m network subsystems $NS_{ij}$ for a parallel processor system, where i and j are natural numbers from 1 to m, being configured into a matrix, each of which network subsystems comprises:

a first input port receiving a destination undecided data to be transmitted from one of a plurality of processor units included in a processor unit set belonging to its own group or another network subsystem for the parallel processor system to another processor unit belonging to its own group or a processor unit belonging to another group;

a second input port receiving a destination decided data from another network subsystem for the parallel processor system;

a group address judging unit making a judgement on said destination undecided data inputted through the first input port as to whether said destination undecided data is addressed to a processor unit belonging to its own group or not;

a network switch unit conducting a switching to the processor unit to which said destination undecided data are addressed when the group address judging unit judges that said destination undecided data is addressed to said processor unit belonging to its own group to output said destination undecided data as a destination decided data;

a destination decided data contention unit having applied said destination decided data fed from the network switch unit and said another destination decided data from the second input port to solve contention when said two destination decided data have the same destination so that the contention generates between said two destination decided data, and outputting said two destination decided data in order;

a first output port outputting said destination decided data supplied from the destination decided data contention unit to said addressed processor unit or another network subsystem for the parallel processor system; and a second output port outputting said destination undecided data as it is to another network subsystem for the parallel processor system when said destination undecided data is judged by the group address judging unit to be addressed to a processing unit belonging to another group;

the m network subsystems $NS_{1j}$, $NS_{2j}$, ...., $NS_{mj}$ forming a network subgroup $NSG_j$, and m sets of the network subgroups $NSG_j$ being formed in said network system;

the first input ports of the network subsystems $NS_{11}$, $NS_{12}$, ...., $NS_{1m}$ belonging to the respective m sets of network subgroups $NSG_1$–$NSG_m$ each being connected to processor unit data output ports of n processor units;

the first output ports of the network subsystems $NS_{11}$, $NS_{12}$, ...., $NS_{1m}$ each being connected to processor unit data input ports of the n processor units;

the first output ports of the network subsystems $NS_{ij}$ except the network subsystems $NS_{11}$, $NS_{12}$, ...., $NS_{1m}$ being connected to the second input ports of the network subsystems $NS_{(i-1)j}$ except the network subsystems $NS_{m1}$, $NS_{m2}$, ...., $NS_{mm}$, respectively;

the second output ports of the network subsystems $NS_{1j}$ belonging to the respective network subgroups $NSG_1$, $NSG_2$, ...., $NSG_{m-1}$ and the second output ports of arbitrary m–2 network subsystems among the network subsystems $NS_{2j}$, $NS_{3j}$, ...., $NS_{mj}$ belonging to the respective network subgroups $NSG_1$, $NSG_2$, ...., $NSG_{m-1}$ being connected to the first input ports of arbitrary network subsystems $NS_{2j}$, $NS_{3j}$, ...., $NS_{mj}$ belonging to the respective neighbouring network subgroups $NSG_2$, $NSG_3$, ...., $NSG_m$, respectively;

the second output ports of the network subsystem $NS_{1m}$ belonging to the network subgroup $NSG_m$ and the second output ports of arbitrary m–2 network subsystems among the network subsystems $NS_{2m}$, $NS_{3m}$, ...., $NS_{mm}$ belonging to the network subgroup $NSG_m$ being arbitrarily connected to the first input ports of the network subsystems $NS_{21}$, $NS_{31}$, ...., $NS_{m1}$ belonging to the network subgroup $NSG_1$, respectively.

38. A network system for a parallel processor system according to claim 37, wherein the network subsystems $NS_{1j}$, $NS_{2j}$, ...., $NS_{mj}$ belonging to the same network subgroup $NSG_j$ are arbitrarily combined with each other, and in each of the combined network subsystems, the group address judging units and the network switch units are respectively combined with each other and only one destination decided data contention unit is commonly used.

39. A network system for a parallel processor system according to claim 38, wherein the network switching unit is formed as a crossbar switch.

40. A network system for a parallel processor system according to claim 38, wherein a plural sets of network groups each comprising said m sets of the network subgroups $NSG_1$–$NGS_m$ are connected in parallel to the processor unit sets each including the n processor units.

41. A network system for a parallel processor system according to claim 40, wherein the network switching unit is formed as a crossbar switch.

42. A network system for a parallel processor system according to claim 38, wherein in the network subgroup $NSG_j$ including the network subsystems $NS_{1j}$, $NS_{2j}$, ...., $NS_{mj}$ belonging to the same network subgroup $NSG_j$, the network subsystems $NS_{1j}$ and $NS_{2j}$, $NS_{3j}$ and $NS_{4j}$, ...., $NS_{(m-1)j}$ and $NS_{mj}$ are respectively combined with each other.

43. A network system for a parallel processor system according to claim 42, wherein the network switching unit is formed as a crossbar switch.

44. A network system for a parallel processor system according to claim 42, wherein a plural sets of network groups each comprising said m sets of the network subgroups $NSG_1$–$NGS_m$ are connected in parallel to the processor unit sets each including the n processor units.

45. A network system for a parallel processor system according to claim 44, wherein the network switching unit is formed as a crossbar switch.

46. A network system for a parallel processor system according to claim 37, wherein a plural sets of network groups each comprising said m sets of the network subgroups $NSG_1$–$NGS_m$ are connected in parallel to the processor unit sets each including the n processor units.

47. A network system for a parallel processor system according to claim 46, wherein the network switching unit is formed as a crossbar switch.

48. A network system for a parallel processor system according to claim 37, wherein the network switching unit is formed as a crossbar switch.

* * * * *